(12) United States Patent
Guo et al.

(10) Patent No.: US 10,304,259 B2
(45) Date of Patent: May 28, 2019

(54) METHOD AND SYSTEM FOR OFFLINE ATTENDANCE PROCESSING

(71) Applicant: Alibaba Group Holding Limited, George Town, Grand Cayman (KY)

(72) Inventors: Chenlu Guo, Hangzhou (CN); Huiquan Huang, Hangzhou (CN); Changyuan Lin, Hangzhou (CN); Taiju Liu, Hangzhou (CN)

(73) Assignee: Dingtalk Holding (Cayman) Limited, Grand Cayman (KY)

( * ) Notice: Subject to any disclaimer, the term of this patent is extended or adjusted under 35 U.S.C. 154(b) by 81 days.

(21) Appl. No.: 15/489,249

(22) Filed: Apr. 17, 2017

(65) Prior Publication Data

US 2017/0309084 A1 Oct. 26, 2017

(30) Foreign Application Priority Data

Apr. 21, 2016 (CN) .......................... 2016 1 0252306

(51) Int. Cl.
*H04L 29/08* (2006.01)
*G07C 1/10* (2006.01)
*G07C 1/12* (2006.01)

(52) U.S. Cl.
CPC .............. *G07C 1/12* (2013.01); *G07C 1/10* (2013.01); *H04L 67/22* (2013.01); *H04L 67/26* (2013.01); *H04L 67/306* (2013.01)

(58) Field of Classification Search
CPC .. G07C 1/10; G07C 1/12; H04L 67/22; H04L 67/26; H04L 67/306
See application file for complete search history.

(56) References Cited

U.S. PATENT DOCUMENTS

| | | | |
|---|---|---|---|
| 7,035,923 B1 * | 4/2006 | Yoakum | H04L 67/24 379/106.01 |
| 7,133,687 B1 | 11/2006 | El-Fishavvy | |
| 7,603,413 B1 | 10/2009 | Herold | |
| 7,835,955 B1 * | 11/2010 | Brodsky | G06Q 10/1091 235/377 |
| 8,165,609 B2 | 4/2012 | Fang | |
| 8,316,096 B2 | 11/2012 | Svendsen | |
| 8,355,699 B1 | 1/2013 | Lo | |

(Continued)

FOREIGN PATENT DOCUMENTS

| | | |
|---|---|---|
| JP | 2011517380 | 6/2011 |
| JP | 2014106592 | 6/2014 |

(Continued)

*Primary Examiner* — Alina A Boutah
(74) *Attorney, Agent, or Firm* — Shun Yao; Park Vaughan Fleming & Dowler LLP

(57) ABSTRACT

Embodiments of the present application provide a method and system for offline attendance processing. During operation, the system may detect an attendance triggering event occurring on a preset page displayed on a client device. The system may determine whether a predetermined data transmission condition is satisfied. In response to determining that the predetermined data transmission condition is not satisfied, the system may buffer, at the client device, attendance-related data corresponding to the attendance triggering event. In response to determining that the predetermined data transmission condition is satisfied, the system may transmit the attendance-related data to a server.

20 Claims, 20 Drawing Sheets

(56) References Cited

U.S. PATENT DOCUMENTS

| | | |
|---|---|---|
| 8,548,865 B1 | 10/2013 | Ho |
| 8,670,791 B2 | 3/2014 | Ye |
| 8,768,310 B1 | 7/2014 | Oroskar |
| 8,769,022 B2 | 7/2014 | Tivyan |
| 8,788,602 B1 | 7/2014 | Wan |
| 8,856,244 B2 | 10/2014 | Madnani |
| 8,880,725 B2 | 11/2014 | Ananthanarayanan et al. |
| 8,968,103 B2 | 3/2015 | Zhou |
| 9,021,040 B1 | 4/2015 | Andrews |
| 9,117,197 B1* | 8/2015 | Sharma .................. G06Q 10/10 |
| 9,143,477 B2 | 9/2015 | Murthy |
| 9,185,062 B1 | 11/2015 | Yang |
| 9,230,244 B2 | 1/2016 | Patil |
| 9,253,639 B1* | 2/2016 | Lafuente ............... H04W 12/06 |
| 2002/0016163 A1 | 2/2002 | Burgan |
| 2002/0120453 A1 | 8/2002 | Lee |
| 2003/0084109 A1 | 5/2003 | Balluff |
| 2003/0135559 A1 | 7/2003 | Bellotti |
| 2003/0154249 A1 | 8/2003 | Crockett |
| 2004/0002932 A1 | 1/2004 | Horvitz |
| 2004/0006599 A1 | 1/2004 | Bates |
| 2004/0102962 A1 | 5/2004 | Wei |
| 2006/0093142 A1 | 5/2006 | Schneier |
| 2007/0299565 A1 | 12/2007 | Oesterling |
| 2008/0114776 A1* | 5/2008 | Sun ........................ H04L 67/24 |
| 2008/0307040 A1 | 12/2008 | So |
| 2008/0307094 A1 | 12/2008 | Karonen |
| 2009/0018903 A1 | 1/2009 | Iyer |
| 2009/0287776 A1 | 11/2009 | Corry |
| 2010/0005402 A1 | 1/2010 | George |
| 2010/0023341 A1 | 1/2010 | Ledbetter |
| 2010/0205541 A1 | 8/2010 | Rapaport |
| 2010/0323752 A1* | 12/2010 | Park ...................... H04L 51/043 455/550.1 |
| 2011/0136431 A1 | 6/2011 | Haaramo |
| 2011/0173548 A1 | 7/2011 | Madnani |
| 2011/0243113 A1 | 10/2011 | Hjelm |
| 2012/0030301 A1 | 2/2012 | Herold |
| 2012/0108268 A1 | 5/2012 | Lau |
| 2012/0185547 A1 | 7/2012 | Hugg |
| 2013/0080580 A1 | 3/2013 | Nagai |
| 2013/0138726 A1 | 5/2013 | Shin |
| 2013/0144702 A1 | 6/2013 | Tabor |
| 2013/0173723 A1 | 7/2013 | Herold |
| 2013/0227041 A1 | 8/2013 | Rideout |
| 2013/0268418 A1* | 10/2013 | Sardi .................. G06Q 10/1091 705/32 |
| 2013/0268765 A1 | 10/2013 | Kent, Jr. |
| 2013/0298006 A1 | 11/2013 | Good |
| 2013/0311920 A1 | 11/2013 | Koo Bon Joon |
| 2013/0332162 A1 | 12/2013 | Keen |
| 2014/0025546 A1* | 1/2014 | Seng .................. G06Q 10/1091 705/32 |
| 2014/0191986 A1 | 7/2014 | Kim |
| 2014/0280615 A1 | 9/2014 | Burlin |
| 2014/0331150 A1 | 11/2014 | Griffin |
| 2014/0372516 A1 | 12/2014 | Watte |
| 2015/0081486 A1* | 3/2015 | Niazi .................... H04L 51/046 705/32 |
| 2015/0170104 A1* | 6/2015 | Yamada ............. G06Q 10/1091 705/32 |
| 2015/0207926 A1 | 7/2015 | Brown |
| 2015/0256353 A1 | 9/2015 | Busey |
| 2015/0264303 A1 | 9/2015 | Chastney |
| 2015/0296450 A1 | 10/2015 | Koo |
| 2015/0310567 A1 | 10/2015 | Wu |
| 2015/0317590 A1 | 11/2015 | Karlson |
| 2015/0350225 A1* | 12/2015 | Perold ..................... H04W 4/02 726/4 |
| 2016/0055215 A1 | 2/2016 | Kauwe |
| 2016/0094509 A1 | 3/2016 | Ye |
| 2016/0125363 A1* | 5/2016 | Hung .................. H04W 4/80 705/32 |
| 2016/0132971 A1* | 5/2016 | Teh ...................... G06Q 40/125 705/32 |
| 2016/0242007 A1* | 8/2016 | Mihara ................. H04W 76/10 |
| 2017/0041255 A1 | 2/2017 | Dong |
| 2017/0142212 A1* | 5/2017 | Bifulco ............... H04L 43/0811 |
| 2017/0185965 A1* | 6/2017 | Nishizawa ......... G06Q 10/1091 |
| 2017/0228699 A1* | 8/2017 | Pang ..................... H04W 12/02 |

FOREIGN PATENT DOCUMENTS

| | | |
|---|---|---|
| JP | 2014115716 | 6/2014 |
| WO | 1999037052 | 7/1999 |
| WO | 2007007330 | 1/2007 |
| WO | 2011117456 | 9/2011 |
| WO | 2014008782 | 1/2014 |
| WO | 2015017029 | 2/2015 |
| WO | 2015113458 | 8/2015 |
| WO | 2016016248 | 2/2016 |
| WO | 2016050146 | 4/2016 |
| WO | 2016054629 | 4/2016 |

* cited by examiner

METHOD AND SYSTEM FOR OFFLINE ATTENDANCE PROCESSING

RELATED APPLICATION

Under 35 U.S.C. 119, this application claims the benefits and rights of priority of Chinese Patent Application No. 201610252306.5, filed 21 Apr. 2016.

BACKGROUND

Field

The present disclosure relates to communication technology, and particularly relates to a method and system for offline attendance processing.

Related Art

In an organization, team managers may need to determine the attendance status of team members in order to understand the operational status of the team and to take corresponding management measures. Therefore, it is necessary to obtain accurate attendance-related data associated with the team members and transfer the data to a team manager in a timely and effective manner, so as to ensure the efficient operation of the team.

SUMMARY

One embodiment of the present invention provides a system for offline attendance processing. During operation, the system may detect an attendance triggering event occurring on a preset page displayed on a client device. The system may determine whether a predetermined data transmission condition is satisfied. In response to determining that the predetermined data transmission condition is not satisfied, the system may buffer, at the client device, attendance-related data corresponding to the attendance triggering event. In response to determining that the predetermined data transmission condition is satisfied, the system may transmit the attendance-related data to a server.

BRIEF DESCRIPTION OF THE DRAWINGS

The accompanying drawings described herein are used for further understanding the present application and constitute a part of the present application, and the schematic embodiments of the present application and the descriptions thereof are used for interpreting the present application, rather than improperly limiting the present application. In which.

DETAILED DESCRIPTION OF EMBODIMENTS

Embodiments of the present invention solve the problem of improving offline attendance processing by allowing a client device (e.g., a mobile device) to buffer attendance-related data and apply locally stored attendance rules to determine an attendance status for a user when requirements for transmitting data are not satisfied. When the transmission requirements are satisfied, the client device may then transmit the buffered data, update the attendance rules, and determine the user's attendance status using the updated rules or receive notification of the user's attendance status from a server.

When data transmission conditions are not satisfied (e.g., the client device is offline), the client device may buffer attendance-related data such as data indicating the user has clocked in. For example, the system may buffer data indicating the time that a user clocks in on an attendance page of an instant messaging application. The system may apply locally stored attendance rules to determine whether a user is clocking in or clocking out on time according to the time specified by the attendance rules, in order to generate a first attendance status indicating whether the user is on time.

The client device may transmit the buffered data to a server when the data transmission conditions are satisfied. For example, the client device may transmit data that is buffered in a local offline queue. The data transmission conditions are satisfied when, for example, the client device is connected to a predetermined network or the network signal strength is at a sufficient level.

In some embodiments, the client device may also update the attendance rules and upload real-time attendance status information to a server when data transmission conditions are satisfied. The client may then apply updated attendance rules that are applicable to the user's time of clocking in or clocking out to determine second attendance status information that indicates whether the user is on time. Some embodiments may also involve the server analyzing the attendance-related data and determining the user's attendance status. The server may then send third attendance status information indicating whether the user is on time to the client device, and the client device may display the user's attendance status.

Exemplary Computing System for Task Processing

Figure 1:
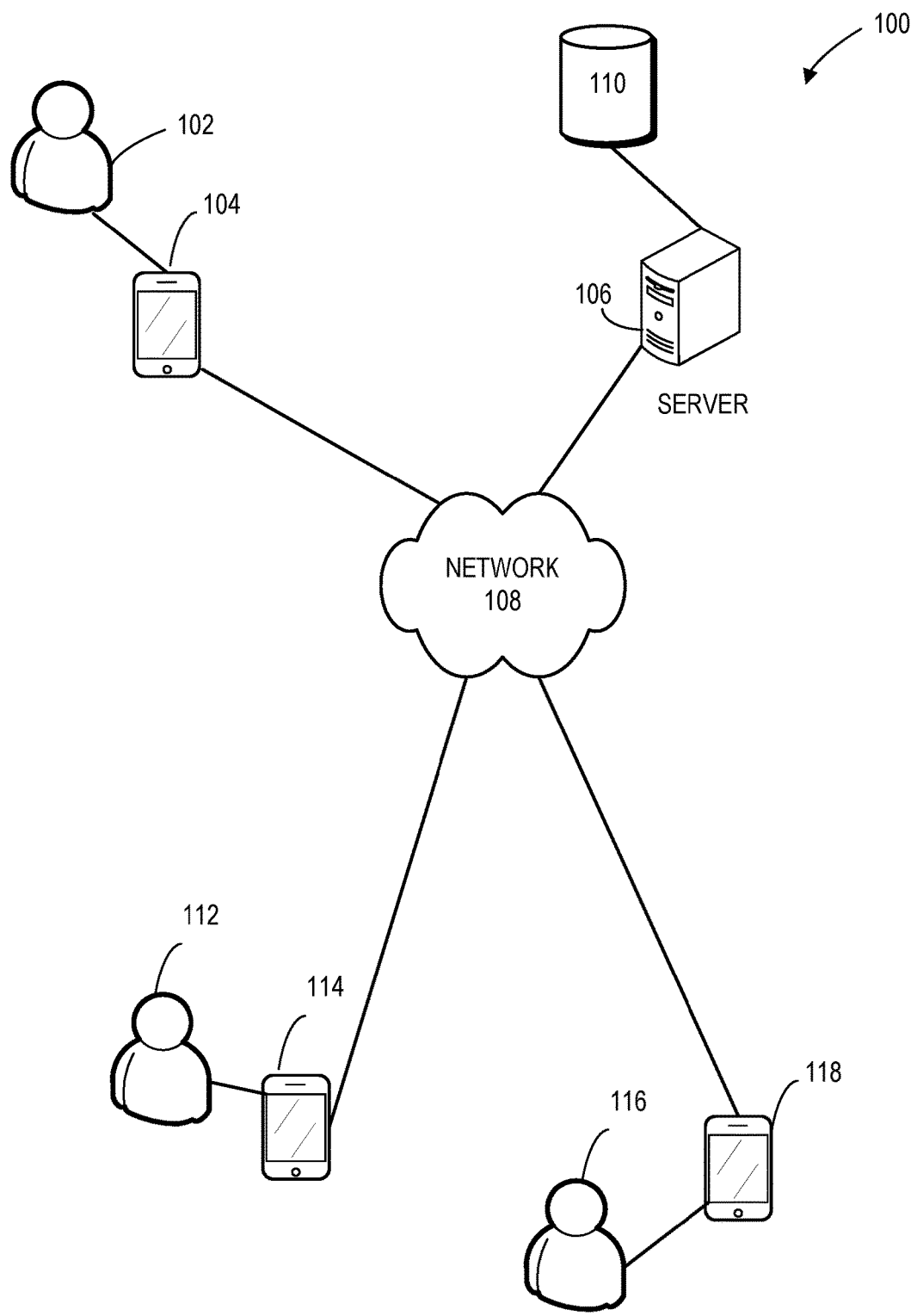
FIG. 1 presents a diagram illustrating an exemplary computing system for offline attendance processing, in accordance with an embodiment of the present invention.

FIG. 1 presents a diagram illustrating an exemplary computing system 100 for offline attendance processing, in accordance with an embodiment of the present invention. As illustrated in FIG. 1, a user 102 may be operating an electronic device 104 with installed modules that allows user 102 to participate in instant messaging, view Internet webpages, initiate voice/video phone calls, share files, and receive e-mails and inquiries. User 102 may also operate electronic device 104 during offline attendance processing. Electronic device 104 may be a mobile device such as a mobile phone, a tablet, a laptop, a desktop computer, or any other type of computing device. User 102 may represent, for example, a user associated with an organization. Electronic device 104 may communicate with a server 106 over a network 108. Server 106 may represent a server that performs operations associated with offline attendance processing. For example, the server may receive attendance-related data uploaded by a client and determine corresponding attendance status information based on the attendance-related data and selected attendance rules. Server 106 may include a storage 110 for storing code for various applications and other data, such as code for instant messaging software (including offline attendance processing management modules) and user and message data. Storage 110 may also store code for the modules described herein, such as an obtaining module which may determine that attendance rules stored on a client device are not applicable to an occurrence time of an attendance triggering event, and obtain attendance rules applicable to the occurrence time from a server. Note that server 106 may represent a cluster of machines supporting functions of the offline attendance processing server.

User 112 may operate a client device 114, and user 116 may operate a client device 118. For example, user 112 may operate client device 114 to connect to server 106 and receive the newest attendance rules and upload real-time attendance status information to server 106. User 112 can also use client device 114 to conduct instant messaging with other parties, such as user 102. Note that each of client devices 114, 116 may be a mobile device such as a mobile phone, a tablet, a laptop, a desktop computer, or any other type of computing device.

In some embodiments, a client can send a request for customized executable code that when installed allows for instant messaging and/or offline attendance processing and/or interacting with server 106. The client can receive the executable code from server 106 and then install the executable code to enable instant messaging, offline attendance processing, and other user interaction with server 106. Further, server 106 can automatically update the executable code.

Note that the techniques discussed in the present disclosure represent an improvement in various technology areas such as human-machine interaction, user interfaces, and digital communications. In particular, the disclosed embodiments improve the management of data on an offline device or a device with limited access to a network. Existing technologies cannot manage data in the manner disclosed on a computing device while the computing device is offline. Current technologies typically merely inform the user that the device is offline and may not perform any functions while offline.

Exemplary Offline Attendance Processing Method

Figure 2:
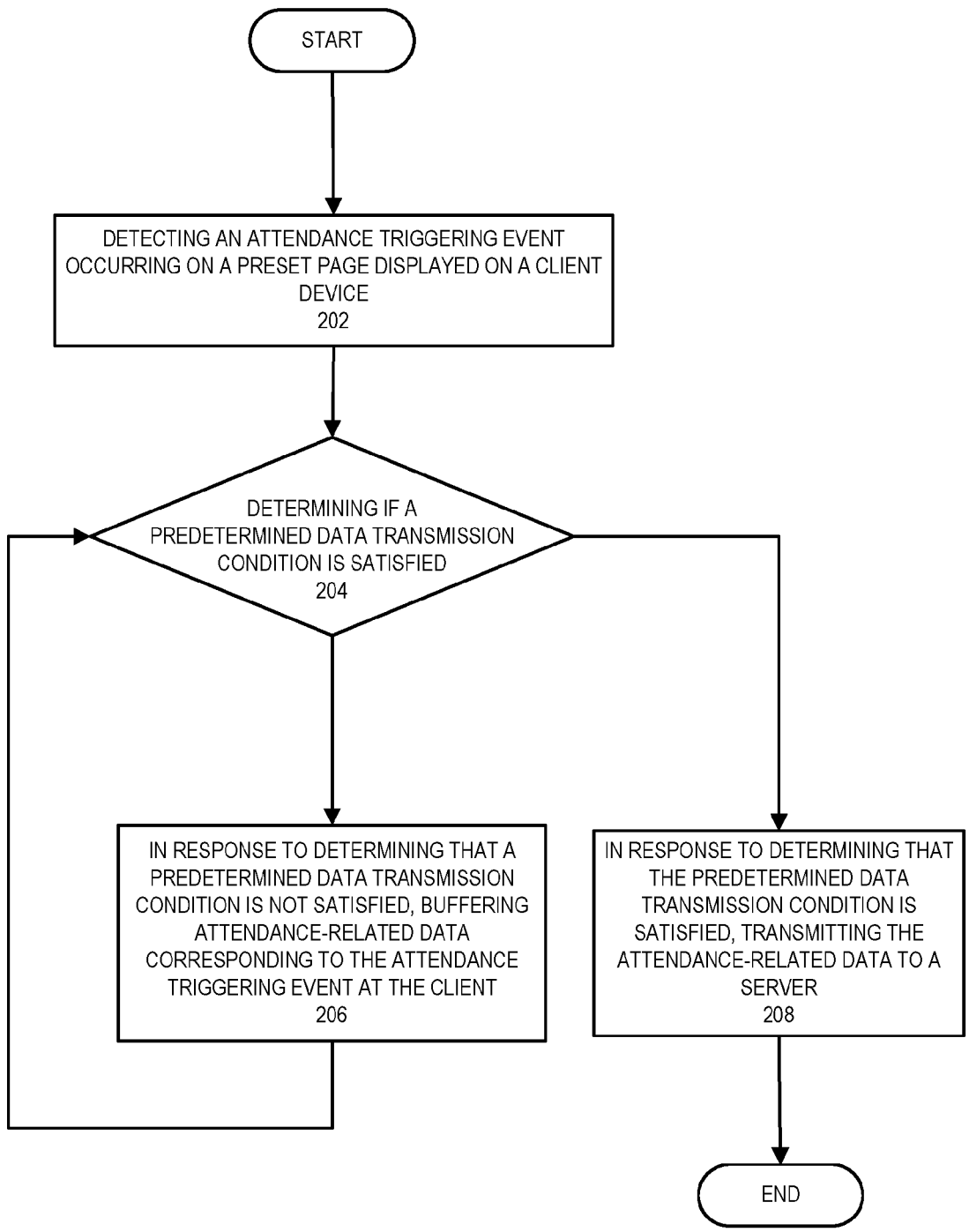
FIG. 2 presents a flowchart illustrating an exemplary process for offline attendance processing, in accordance with an embodiment of the present invention.

FIG. 2 presents a flowchart illustrating an exemplary process for offline attendance processing, in accordance with an embodiment of the present invention. As illustrated in FIG. 2, the method may be performed by a client on an electronic device and may include the following operations:

The client may detect an attendance triggering event occurring on a preset page displayed on a client device (operation 202).

The electronic device may be installed with client software of an application having an attendance management function. The application may display a preset page such as an attendance page to a user and detect an attendance triggering event performed by the user on the preset page, so as to complete a user attendance operation. Note that even if the electronic device is in an offline state, the user can perform a triggering operation on the preset page and the electronic device may detect a corresponding attendance triggering event. This ensures that the system allows for managing user attendance in any state.

The application installed on the electronic device may be an instant messaging application with an attendance management function, which allows the application to detect an attendance triggering event. The instant messaging application may be an enterprise instant messaging (EIM) application such as DingTalk.

The client may determine if a predetermined data transmission condition is satisfied (operation 204).

In response to determining that a predefined data transmission condition is not satisfied, the client may buffer attendance-related data corresponding to the attendance triggering event (operation 206).

In response to determining that the data transmission condition is satisfied, the client may transmit the attendance-related data to a server (operation 208).

In an embodiment, the predefined data transmission condition may include at least one of requiring a connection to a predetermined network and requiring a strength level of a network signal to reach a predetermined value. In an actual scenario, the system may select and adjust the data transmission condition as required.

Exemplary Attendance Processing with Instant Messaging Application

Figure 3:
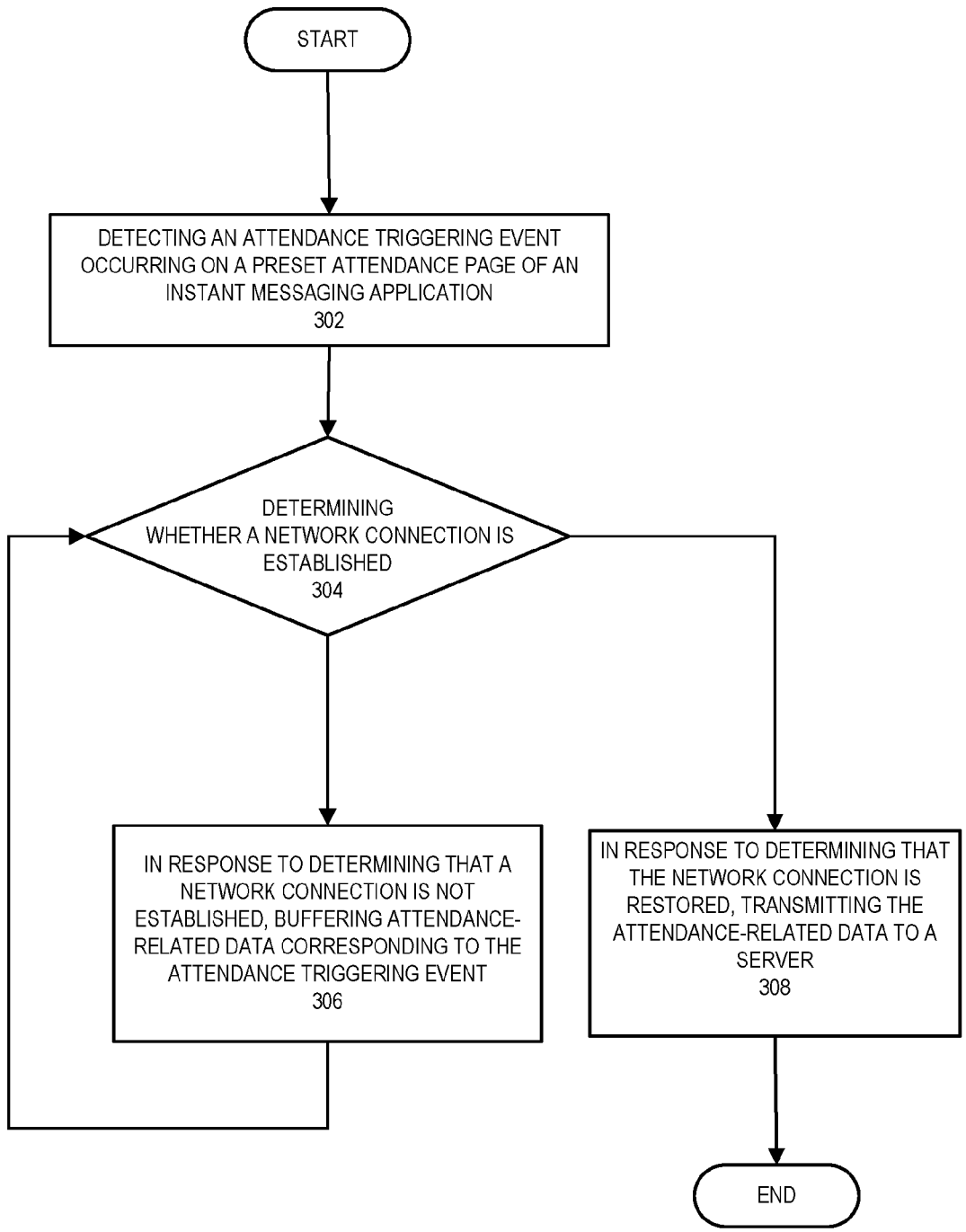
FIG. 3 presents a flowchart illustrating an exemplary process for attendance processing with an instant messaging application, in accordance with an embodiment of the present invention.

FIG. 3 presents a flowchart illustrating an exemplary process for attendance processing with an instant messaging application, in accordance with an embodiment of the present invention. As illustrated in FIG. 3, the method may include the following operations:

The client may detect an attendance triggering event occurring on a preset attendance page of an instant messaging application (operation 302). In an embodiment, the attendance triggering event may occur on the preset attendance page while the client device is in an offline state. This is an implementation of an offline attendance function similar to that illustrated in FIG. 2.

The client may determine whether a network connection is established (operation 304).

In response to determining that a network connection is not established, the client may buffer attendance-related data corresponding to the attendance triggering event (operation 306).

In response to determining that the network connection is restored, the client may transmit the attendance-related data to a server (operation 308).

The attendance function may be integrated into an instant messaging application. A user may then take full advantage of the mobility and convenience of the instant messaging application to conveniently perform an attendance operation. There is no need for the user to purchase or add a special attendance management device. With the offline attendance function provided in embodiments of the present invention, attendance management functions are possible even if there is no network connection. This helps to avoid difficulties for management in an enterprise scenario or in other team environments.

The client may be in an offline state and detect an attendance triggering event performed by a user. The client may determine the state of a data transmission condition. The client may perform local offline buffering of attendance-related data if the data transmission condition is not satisfied. The client may transmit the attendance-related data to a server after the data transmission condition is satisfied, so that the attendance-related data can be transferred to a team manager in time to manage a team.

Exemplary System Architecture

Figure 4:
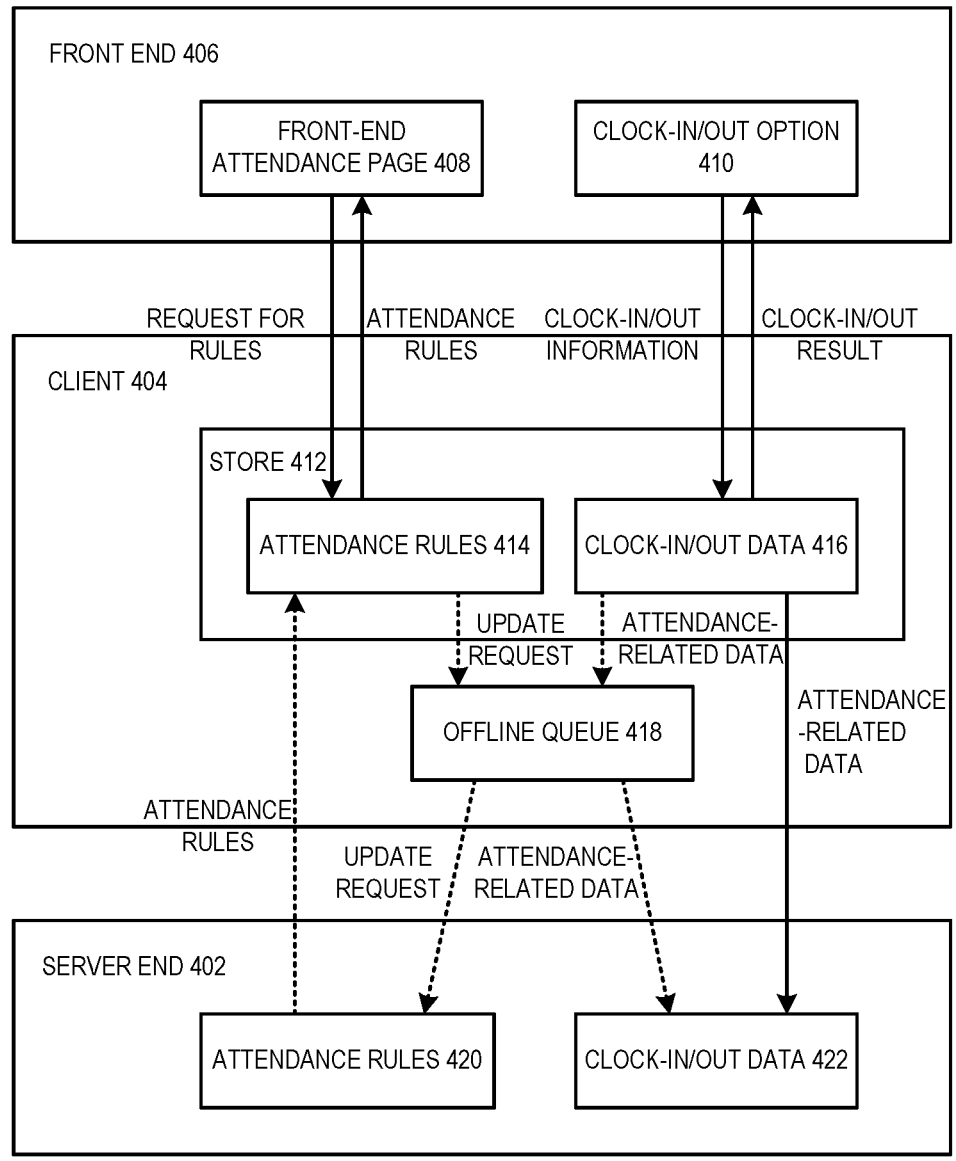
FIG. 4 presents a schematic diagram illustrating an exemplary system architecture for implementing an offline attendance management function, in accordance with an embodiment of the present invention.

FIG. 4 presents a schematic diagram illustrating an exemplary system architecture for implementing an offline attendance management function, in accordance with an embodiment of the present invention. As illustrated in FIG. 4, the system architecture may include a server end 402, a client 404, and a front end 406. The server end may be part of a server. The client and the front end may be implemented as applications (for example, the enterprise instant messaging application DingTalk) installed and executing on a computing device operated by a user.

Figure 6:
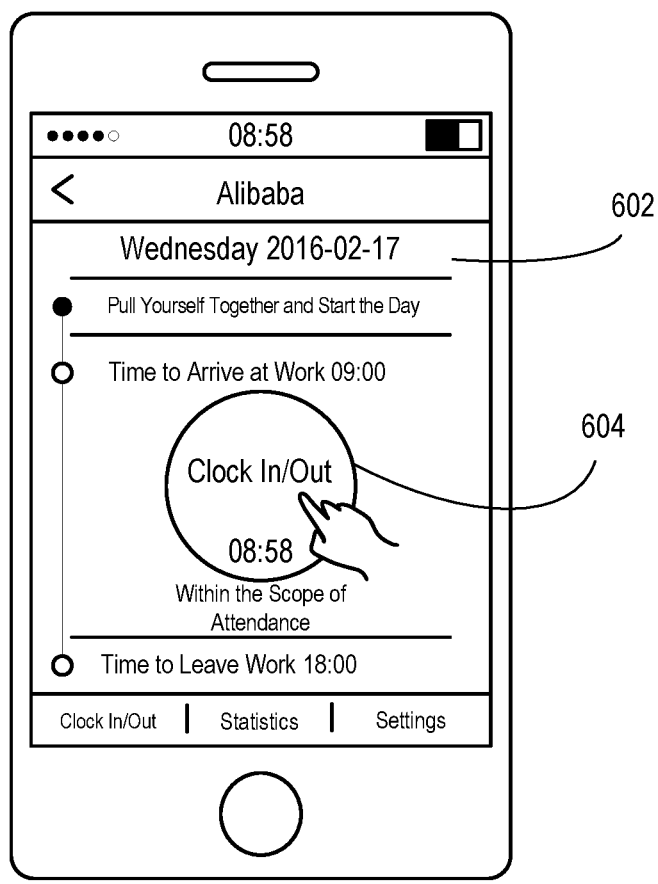
FIG. 6 presents a schematic diagram illustrating an exemplary front-end attendance page, in accordance with an embodiment of the present invention.

In FIG. 4, a front-end attendance page 408 in front end 406 represents the data and functions for implementing a front-end attendance page (described below with respect to FIG. 6). A clock-in/out option 410 represents the data and functions for implementing a clock-in/out option with a control displayed on the front-end attendance page (described with respect to FIG. 6 below). A store 412 in client 404 represents the functions for implementing storage, and attendance rules 414 represents the functions for implementing attendance rules and data associated with the attendance rules. A clock-in/out data 416 represents the clock-in/out data and functions for processing clock-in/out data. Client 404 may also include an offline queue 418 for storing buffered data. Server end 402 may include attendance rules 420 and clock-in/out data 422, which are discussed further below with respect to FIG. 7 and FIG. 13, respectively.

Exemplary Microapplication Page and Front-End Attendance Page

Figure 5:
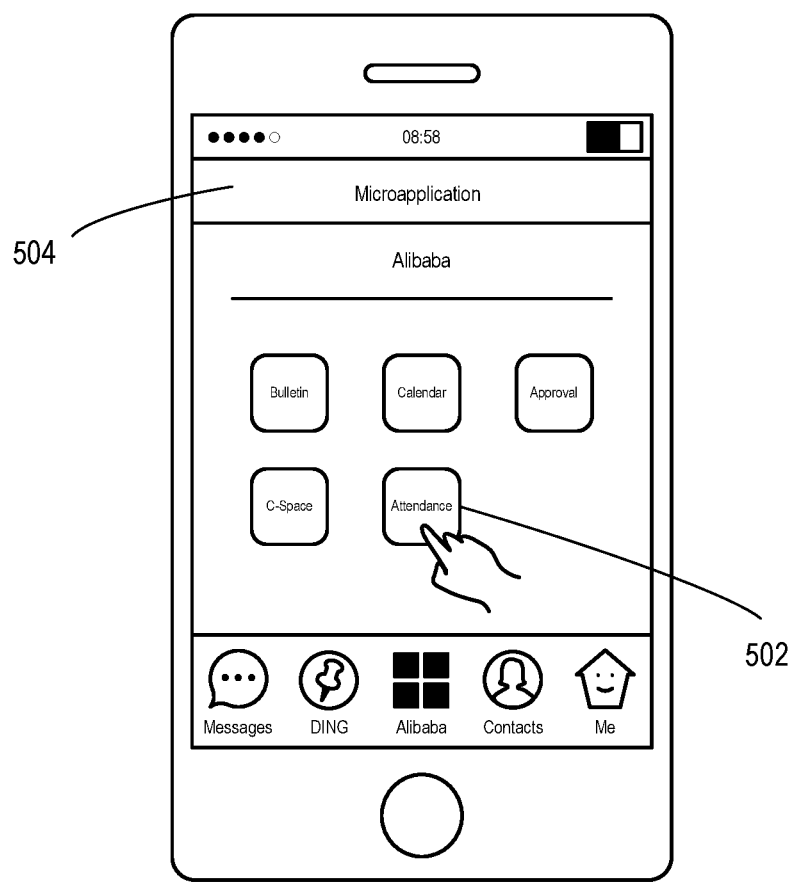
FIG. 5 presents a schematic diagram illustrating an exemplary microapplication page, in accordance with an embodiment of the present invention.

FIG. 5 presents a schematic diagram illustrating an exemplary microapplication page, in accordance with an embodiment of the present invention. FIG. 6 presents a schematic diagram illustrating an exemplary front-end attendance page, in accordance with an embodiment of the present invention.

In one scenario, the user may install client software with the front end at the same time when installing an application. The user may start the application and select an attendance icon 502 on a microapplication page 504 as illustrated in FIG. 5. The system may display a front-end attendance page 602 as illustrated in FIG. 6 with a clock-in/out option (for example, a round clock in/out button 604 as depicted in the middle of FIG. 6) by using only local data configured on the electronic device during installation.

In another scenario, the user may only install client software when installing an application. After the user starts the application and selects attendance icon 502 on microapplication page 504 as illustrated in FIG. 5, the client may download related page data and display front-end attendance page 602 with the clock-in/out option (e.g., round clock in/out button 604) as illustrated in FIG. 6. For example, the front-end attendance page and the clock-in/out option may be implemented using HTML5 technology. The front end and the client may exchange data as needed to provide the functions described herein.

The system architecture illustrated in FIG. 4 and the offline attendance processing solution of the present application will be described in detail below with reference to FIG. 7 and related drawings.

Exemplary Offline Attendance Processing Method and Front-End Attendance Pages

Figure 7:
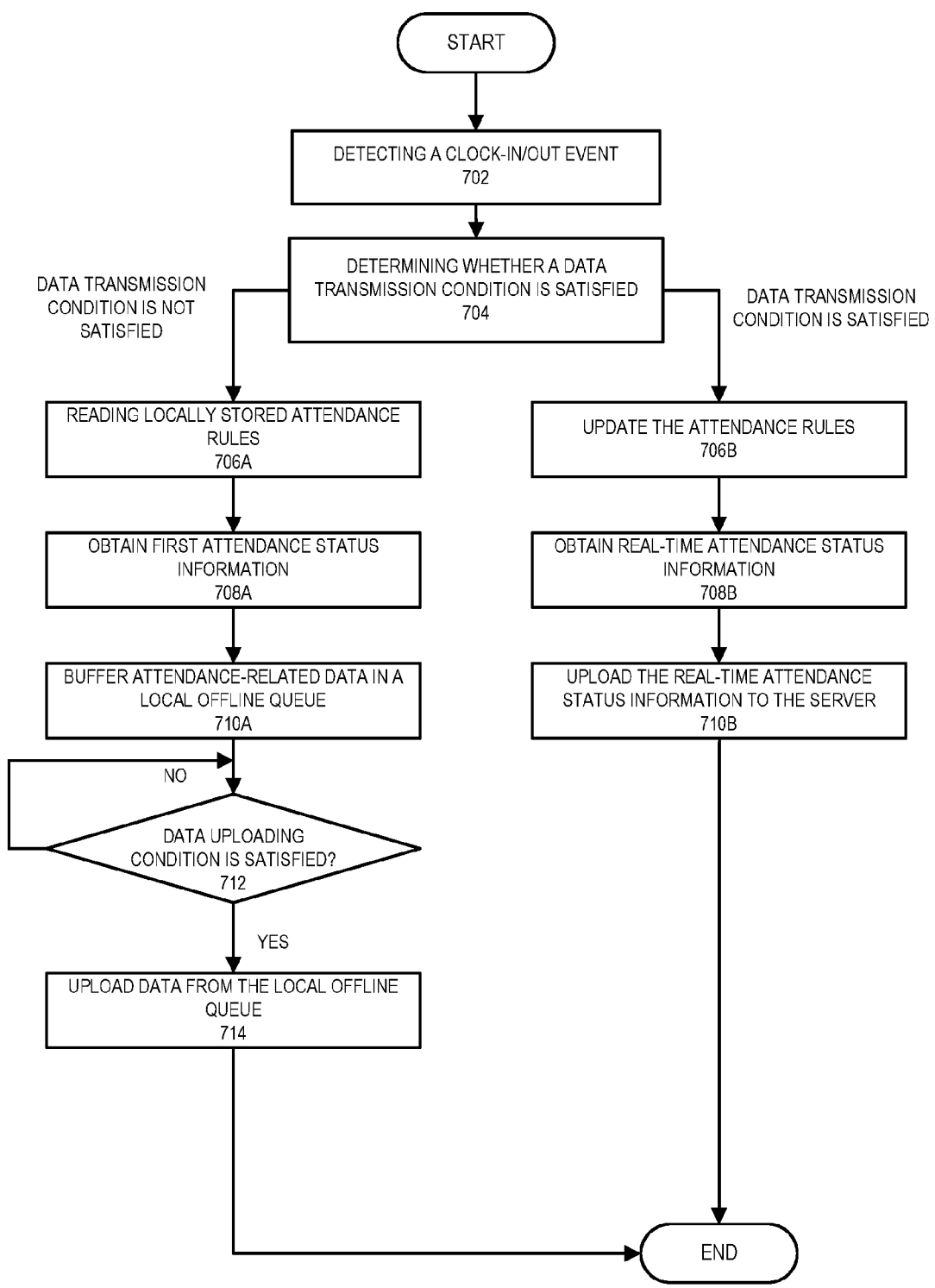
FIG. 7 presents a flowchart illustrating an exemplary process for another offline attendance processing method, accordance with an embodiment of the present invention

FIG. 7 presents a flowchart illustrating an exemplary process for another offline attendance processing method, accordance with an embodiment of the present invention. As illustrated in FIG. 7, the method may include the following operations:

The client may initially detect an attendance triggering event (e.g., a clock-in/out event) (operation 702). The client may determine whether a data transmission condition is satisfied (operation 704). In response to determining that the data transmission condition is not satisfied, the client may read locally stored attendance rules (operation 706A), and obtain (e.g., generate) first attendance status information (operation 708A). The client may then buffer attendance-related data in a local offline queue (operation 710A). When the data transmission condition is satisfied, the client may proceed with operation 714 (operation 712). Otherwise, the client may continue to wait. The client may then upload data in the local offline queue to the server end (operation 714).

In response to determining that the data transmission condition is satisfied at operation 704, the client may update the attendance rules (operation 706B). The client may obtain real-time attendance status information (operation 708B). The client may then upload the real-time attendance status information to the server (operation 710B).

These operations of FIG. 7 are discussed in greater detail below.

The client may initially detect an attendance triggering event (e.g., a clock-in/out event) (operation 702). The client may determine whether a data transmission condition is satisfied (operation 704). In response to determining that a predefined data transmission condition is not satisfied, the client may proceed with operation 706A. In response to determining that the data transmission condition is satisfied, the client may proceed with operation 706B.

In response to detecting a predetermined operation of the user on a preset page (for example, a front-end attendance page), the client may determine that an attendance triggering event is detected. For example, as illustrated in FIG. 6, the predetermined operation may include a user clicking on a round button with label "Clock In/Out" 604. The client may detect the attendance triggering event when the electronic device is in an offline state. In other words, even if the electronic device is in an offline state, the client may display a front-end attendance page such as that illustrated in FIG. 6. The user can then perform a triggering operation (e.g., touch the round button with label "Clock In/Out" 604) on the front-end attendance page to enable the electronic device to detect a corresponding attendance triggering event. This ensures that the client may manage attendance for the user in any state.

The data transmission condition may be any predefined condition, and the client may determine how to process attendance-related data according to the state of the data transmission condition (e.g., the satisfaction status of the data transmission condition) in an actual scenario. For example, the data transmission condition may include at least one of requiring a connection to a predetermined network and requiring a strength level of a network signal to reach a predetermined value.

1) Requiring a connection to a predetermined network. In one scenario, the predetermined network may be any network that allows the client to communicate with the server end. For example, the network may be a 3G or 4G wireless mobile telecommunication network or a WiFi wireless local area network. The client can connect to the network and upload data such as attendance-related data to the server end.

In another scenario, the predetermined network may be a predefined specific network such as a WiFi network of a company. The system may determine that the data transmission condition is satisfied only if the client connects to the predetermined specific network. Due to information security concerns, the system may determine that the data transmission condition is not satisfied even if another network allows for connecting and interacting with the server end.

2) Requiring a strength level of a network signal to reach a predetermined value. The system may determine whether a corresponding predetermined network is stable enough by comparing the signal strength of network signals. When the network signal strength reaches the predetermined value, the predetermined network may allow for uploading of attendance-related data to the server end. The system may then determine that the data transmission condition is satisfied.

The client may read locally stored attendance rules (operation 706A).

As illustrated in FIG. 4, after the front-end attendance page initiates a request for rules to the client, the client may return stored attendance rules to the front-end attendance page. The front-end attendance page may display information such as "Time to Arrive at Work: 09:00" and "Time to Leave Work: 18:00" as illustrated in FIG. 6. These specific times may serve as criteria for reviewing and evaluating corresponding attendance triggering events, e.g., determining whether the user clocks in/out normally, arrives late, or leaves early. Similarly, the attendance rules may further include attendance location information such as "XX Mansion, XX District, XX City, XX Province," which can also be used for determining the attendance status.

The client may obtain first (or second) attendance status information (operation 708A).

As illustrated in FIG. 4, the front end may return corresponding clockin/out information to the client based on user operation on the clock-in/out option (e.g., round clock in/out button 604). The client may obtain first (or second) attendance status information as clock-in/out data 416. The clock-in/out information is actually data describing an attendance triggering event of the user, such as a clock-in/out time or a geographic location. The client may apply the appropriate (e.g., applicable or relevant) locally stored attendance rules to the data describing the attendance triggering event to obtain the first (or second) attendance status information as the clock-in/out data 416 illustrated in FIG. 4. For example, data describing an attendance triggering event may include an occurrence time associated with the attendance triggering event. The occurrence time illustrated in FIG. 6 is "08:58", and the corresponding criterion in the attendance rules for time to arrive at work is "09:00". By comparing the occurrence time with the time in the attendance rules, the system may determine that the user clocks in normally and is not late, and the first (or second) attendance status information may indicate a normal clock-in time.

Based on whether the data transmission condition is satisfied, the system may display first reminding information corresponding to the satisfaction status in or near an attendance triggering area on the front-end attendance page. The attendance triggering area may be used to trigger an attendance triggering event. For example, the attendance triggering area may be a display area indicated by the round button with the "Clock In/Out" text 604 as illustrated in FIG. 6. When the data transmission condition is satisfied, as illustrated in FIG. 6, the first reminding information may be the text "Clock In/Out" 604 displayed in the attendance triggering area.

Figure 8:
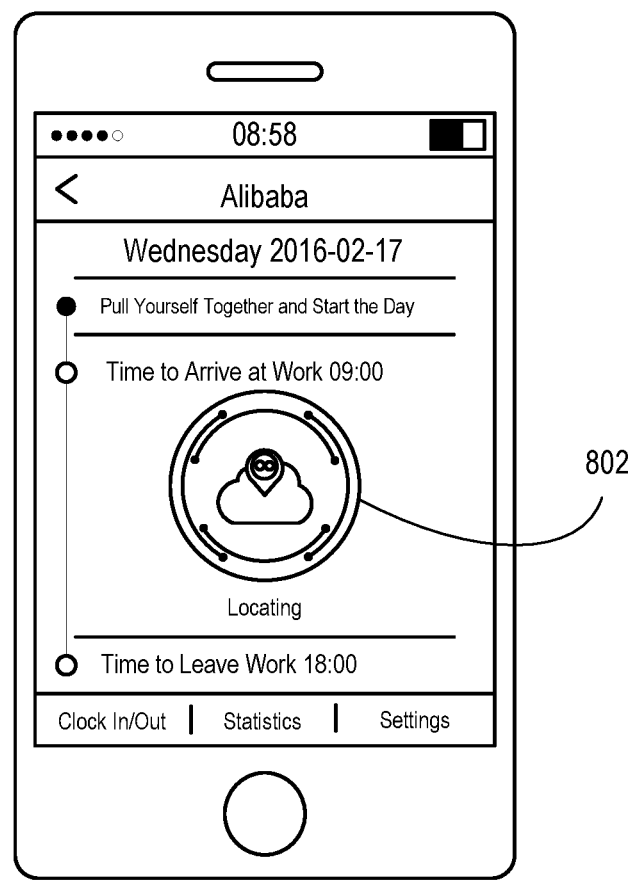
FIG. 8 presents a schematic diagram illustrating an exemplary display of a front-end attendance page with a predetermined icon representing first reminding information, in accordance with an embodiment of the present invention.

FIG. 8 presents a schematic diagram illustrating an exemplary display of a front-end attendance page with a predetermined icon representing first reminding information, in accordance with an embodiment of the present invention. When the data transmission condition is not satisfied, as illustrated in FIG. 8, the first reminding information may be presented as a predetermined icon 802 displayed in the attendance triggering area, which is distinguishable from the displayed text "Clock In/Out" 604.

Figure 9:
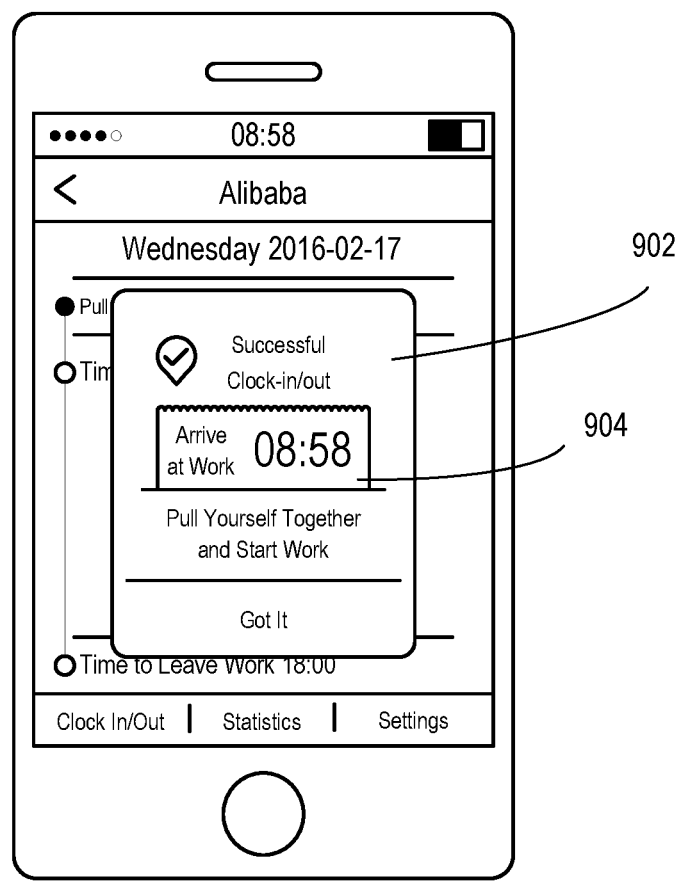
FIG. 9 presents a schematic diagram illustrating an exemplary display of a front-end attendance page with a successful clock-in result, in accordance with an embodiment of the present invention.

FIG. 9 presents a schematic diagram illustrating an exemplary display of a front-end attendance page with a successful clock-in result, in accordance with an embodiment of the present invention. After receiving clock-in/out information from the front end or obtaining clock-in/out data based on the clock-in/out information, the client may return a clock-in/out result to the front end. The front end may then display a text "Successful Clock-in/out" 902 and display a clock-in/out time "08:58" 904 as illustrated in FIG. 9.

The client may then buffer attendance-related data in a local offline queue (operation 710A).

The attendance-related data may include any attendance data related to an attendance triggering event. For example, the data may include the first attendance status information and description information associated with the attendance triggering event. The description information is data describing the attendance triggering event.

The client may buffer attendance-related data in a local offline queue, so that even if the data transmission condition is not satisfied and the system cannot determine attendance in real time, the client may perform offline buffering and asynchronous uploading of the attendance-related data to the server end. The server end thereby obtains the attendance-related data and may manage attendance for the user.

In response to determining that the data transmission condition is satisfied, the client may proceed with operation 714 (operation 712). Otherwise, the client may continue to wait.

The client may upload data in the local offline queue to the server end (operation 714).

The local offline queue may include the attendance-related data, and the client may upload the attendance-related data to the server end. Even if the data transmission condition temporarily cannot be satisfied, the server can asynchronously obtain offline attendance-related data associated with the user and manage attendance for the user.

Figure 10:
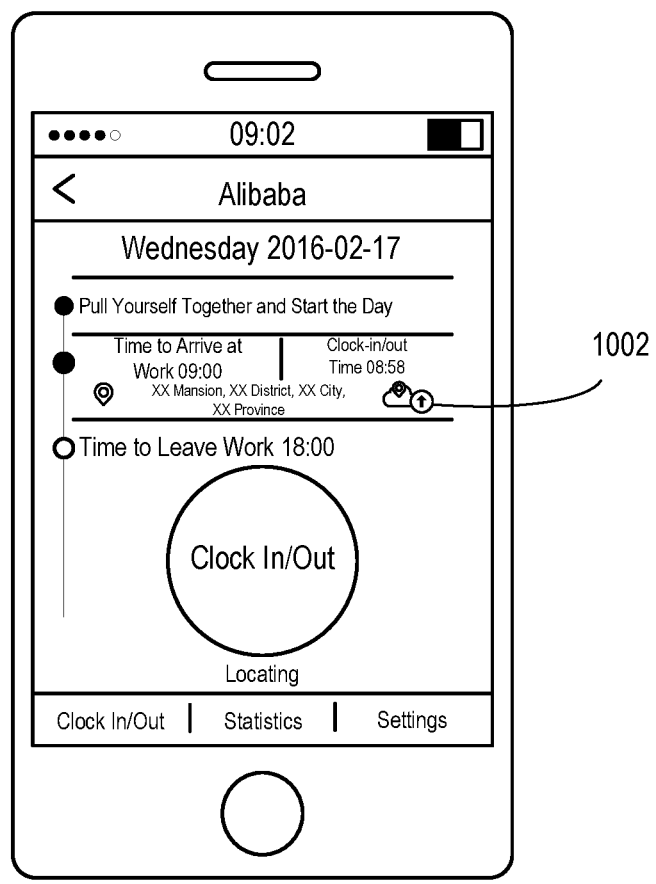
FIG. 10 presents a schematic diagram illustrating an exemplary display of a front-end attendance page with a predetermined icon representing second reminding information associated with a not uploaded state, in accordance with an embodiment of the present invention.

FIG. 10 presents a schematic diagram illustrating an exemplary display of a front-end attendance page with a predetermined icon representing second reminding information associated with a not uploaded state, in accordance with an embodiment of the present invention. The system may display second reminding information based on the upload status of the attendance-related data. The system may display the second reminding information on or near an attendance-related data presentation area on the front-end attendance page. For example, in one scenario the data transmission condition may not be satisfied and the status of the attendance-related data may be not yet uploaded. The system may then display the second reminding information as a first icon 1002 on the right side of the geographic location information "XX Mansion, XX District, XX City, XX Province" in FIG. 10. The first icon is similar to the first reminding information illustrated in FIG. 8, and the not uploaded state is indicated with an arrow "↑" as illustrated in FIG. 10.

Figure 11:
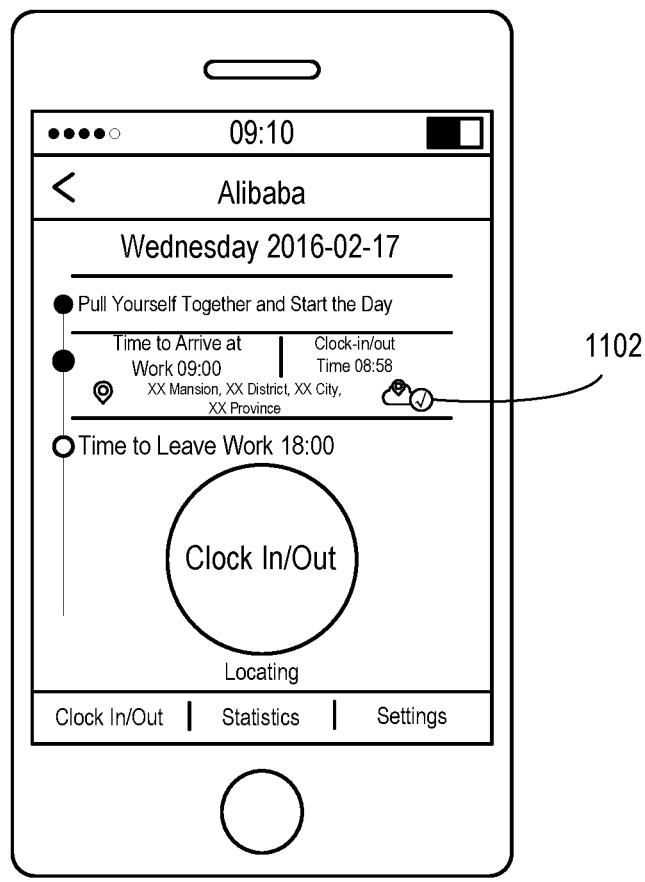
FIG. 11 presents a schematic diagram illustrating an exemplary display of a front-end attendance page with a predetermined icon representing second reminding information associated with an already uploaded state, in accordance with an embodiment of the present invention.

FIG. 11 presents a schematic diagram illustrating an exemplary display of a front-end attendance page with a predetermined icon representing second reminding information associated with an already uploaded state, in accordance with an embodiment of the present invention. When the data transmission condition is satisfied and the attendance-related data is already uploaded, the system may display second reminding information as a second icon 1102 on the right side of the geographic location information "XX Mansion, XX District, XX City, XX Province" as illustrated in FIG. 11. The second icon is similar to the first icon but indicates the uploaded state using the check mark "√" as illustrated in FIG. 11.

In addition to the asynchronous and offline uploading of the attendance-related data, when the data transmission condition is not satisfied the client may further generate and add to the local offline queue an update request related to the locally stored attendance rules. This implements data interaction with the server end through an upload operation of the local offline queue after the data transmission condition is satisfied, and updates the locally stored attendance rules. For example, such an update may change the attendance time and/or attendance place required by a rule. This procedure corresponds to the data transmission path from attendance rules 414 to an offline queue 418 in the client, then to attendance rules 420 at the server end, and back to the attendance rules 414 at the client in the architecture diagram illustrated in FIG. 4.

In response to determining that the data transmission condition is satisfied in operation 704, the client may update the attendance rules (operation 706B).

The client may obtain real-time attendance status information (operation 708B).

The client may upload the real-time attendance status information to the server (operation 710B).

Not only can the client update the attendance rules after detecting an attendance triggering event, but the client can also update the attendance rules periodically according to a predetermined duration, which can ensure accurate management of user attendance.

As illustrated in FIG. 7, the client may directly detect and determine the attendance status of the user to obtain first attendance status information without requiring analysis and determination from the server end. In some scenarios, the attendance rules stored locally on the client may not be the newest rules. For example, the originally scheduled time to arrive at work may be 09:00, while the updated time to arrive at work is 08:30. If the clock-in/out time is at 08:58, this indicates a normal clock in time under the original attendance rules, but is considered late according to the updated attendance rules. Therefore, the client may add description information associated with an attendance triggering event to attendance-related data uploaded to the server for future tracing.

Exemplary Offline Attendance Processing Method

Figure 12:
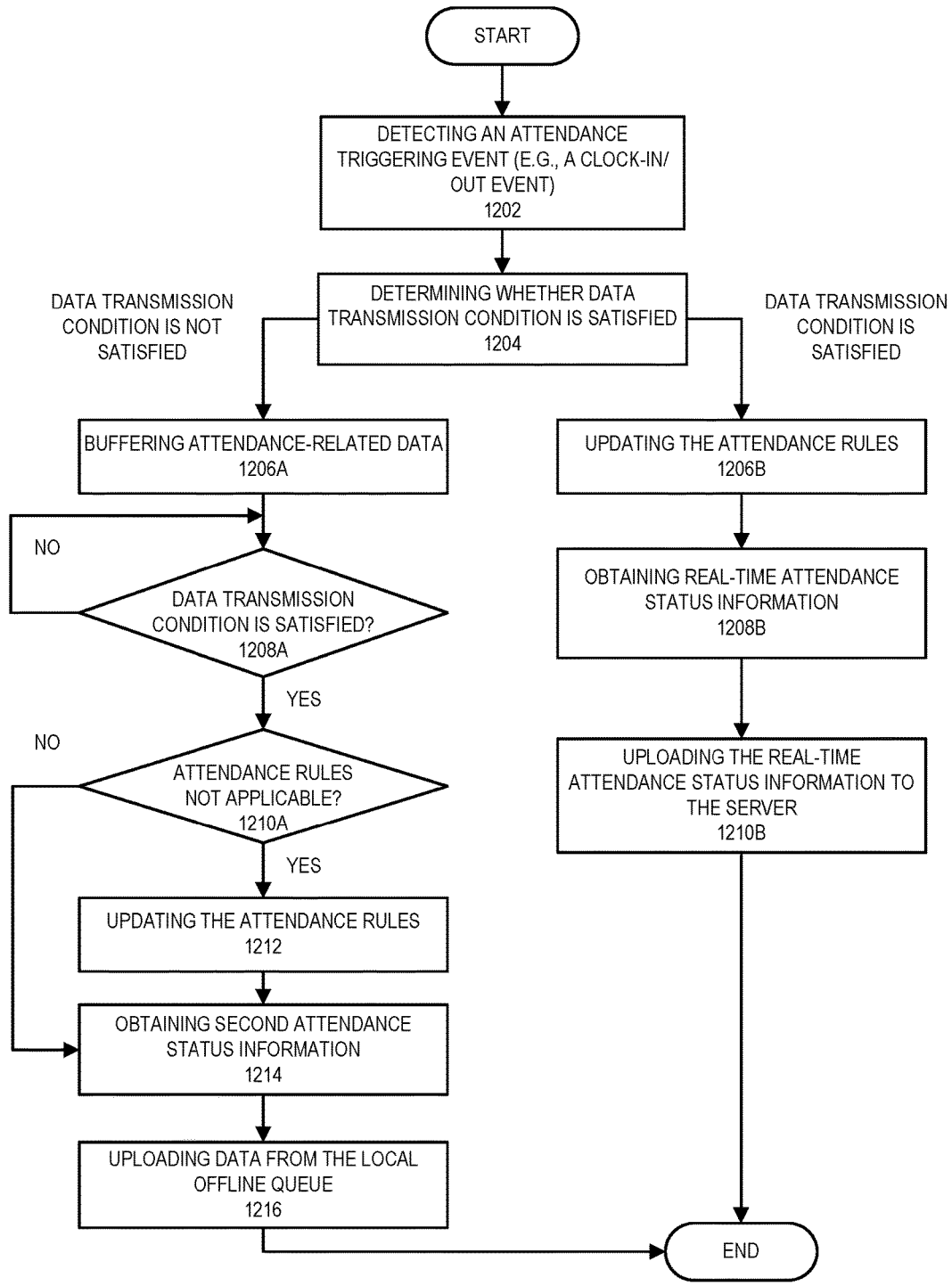
FIG. 12 presents a flowchart illustrating another offline attendance processing method, in accordance with an embodiment of the present invention.

FIG. 12 presents a flowchart illustrating another offline attendance processing method, in accordance with an embodiment of the present invention. As illustrated in FIG. 12, the method may include the following operations:

The client may detect an attendance triggering event (operation 1202). The client may determine whether a predefined data transmission condition is satisfied (operation 1204). In response to determining that a predefined data transmission condition is not satisfied, the client may proceed with operation 1206A. In response to determining that the data transmission condition is satisfied, the client may proceed with operation 1206B.

The client may buffer attendance-related data (operation 1206A). The client may add the attendance-related data to a local offline queue, where the attendance-related data may include data describing the attendance triggering event.

If the client determines that the data transmission condition (e.g., data uploading condition) is satisfied, the client may respond by continuing with operation 1210A (operation 1208A). Otherwise, the client may continue to wait.

If the client determines that the attendance rules are not applicable to an occurrence time of the attendance triggering event, the client may respond by continuing with operation 1212 (operation 1210A). Otherwise, the client may proceed with operation 1214.

The client may update the locally stored attendance rules (operation 1212).

The client may obtain (e.g., generate) second attendance status information (operation 1214). The generated second attendance status information indicates whether the user is on time.

If the client determines that the locally stored attendance rules are not applicable to the occurrence time of the attendance triggering event, the client may obtain attendance rules applicable (e.g., appropriate or relevant) to the occurrence time from a server. The client may obtain second attendance status information by comparing and matching up the data describing the attendance triggering event with the applicable attendance rules. The attendance-related data may include the second attendance status information.

In one example, the current time may be "2016-02-20 09:30" and the occurrence time of the attendance triggering event may be "2016-02-17 08:58". The most recent update time of the attendance rules stored locally on the client is "2016-02-10 02:30" and the attendance rules are updated at "2016-02-16 02:30". That is, the attendance triggering event occurs after the update of the attendance rules and the client stores old attendance rules that have not been updated. If the system uses the old attendance rules stored locally on the client to determine punctuality, the system may erroneously determine that a user is not on time because the old attendance rules are not applicable to the occurrence time of the attendance triggering event. For example, the time to arrive at work specified in the attendance rules stored locally on the client may be "09:00", while the time to arrive at work specified in the attendance rules updated at "2016-02-16 02:30" is "08:30". The system may determine that an occurrence time "2016-02-17 08:58" of an attendance triggering event is a normal clock-in time under the old attendance rules stored locally on the client, but the same occurrence time "2016-02-17 08:58" is late under the updated attendance rules. Using the process flow of operation 1210A to operation 1212, and then to operation 1214, the system can ensure that the client updates the attendance rules in time to guarantee the correctness of the second attendance status information.

The system should use attendance rules that are applicable to the occurrence time of the attendance triggering event. For example, the most recent update time of the attendance rules stored locally on the client may be "2016-02-10 02:30" and the system may update the attendance rules at "2016-02-18 02:30". If the attendance triggering event occurs before the update of the attendance rules, then the system should not apply the updated attendance rules. Instead, the system should apply the attendance rules stored locally on the client. The system therefore utilizes the attendance rules that are applicable to the occurrence time of the attendance triggering event. In other words, the system utilizes attendance rules that match up with the occurrence time of the attendance triggering event.

In another example, the time to arrive at work specified in the attendance rules stored locally on the client may be "09:00", while the time to arrive at work specified in the attendance rules updated at "2016-02-18 02:30" may be "08:30". In this scenario, the system should evaluate the occurrence time "2016-02-17 08:58" of the attendance triggering event using the attendance rules stored locally on the client and the clock-in/out result indicates a normal clock-in time. The system may apply the processing flow of operation 1210A to operation 1214, so that the attendance rules are applicable to the attendance triggering event, in order to guarantee the correctness of the second attendance status information.

Afterwards, the client may add the second attendance status information to the attendance-related data in the local offline queue. The attendance-related data may include description information such as the occurrence time and geographic location of the attendance triggering event.

The client may upload data from the local offline queue to the server end (operation 1216). The client may perform a data uploading operation similar to operation 714 in the embodiment illustrated in FIG. 7 for the local offline queue.

In response to determining that the data transmission condition is satisfied in operation 1204, the client may update the attendance rules (operation 1206B).

The client may obtain real-time attendance status information (operation 1208B).

The client may upload the real-time attendance status information to the server (operation 1210B). The data uploading operation for the local offline queue may be performed as described with respect to operations 706B-710B illustrated in FIG. 7.

The embodiments illustrated in FIG. 7 and FIG. 12 involve a client directly obtaining the attendance status of a user. For example, the user may clock in/out normally, arrive late, or leave early, and the client uploads the attendance status to a server end. In some embodiments, the server may also determine the attendance status of a user as described below with reference to FIG. 13.

Exemplary Method for Displaying Third Attendance Status Information

Figure 13:
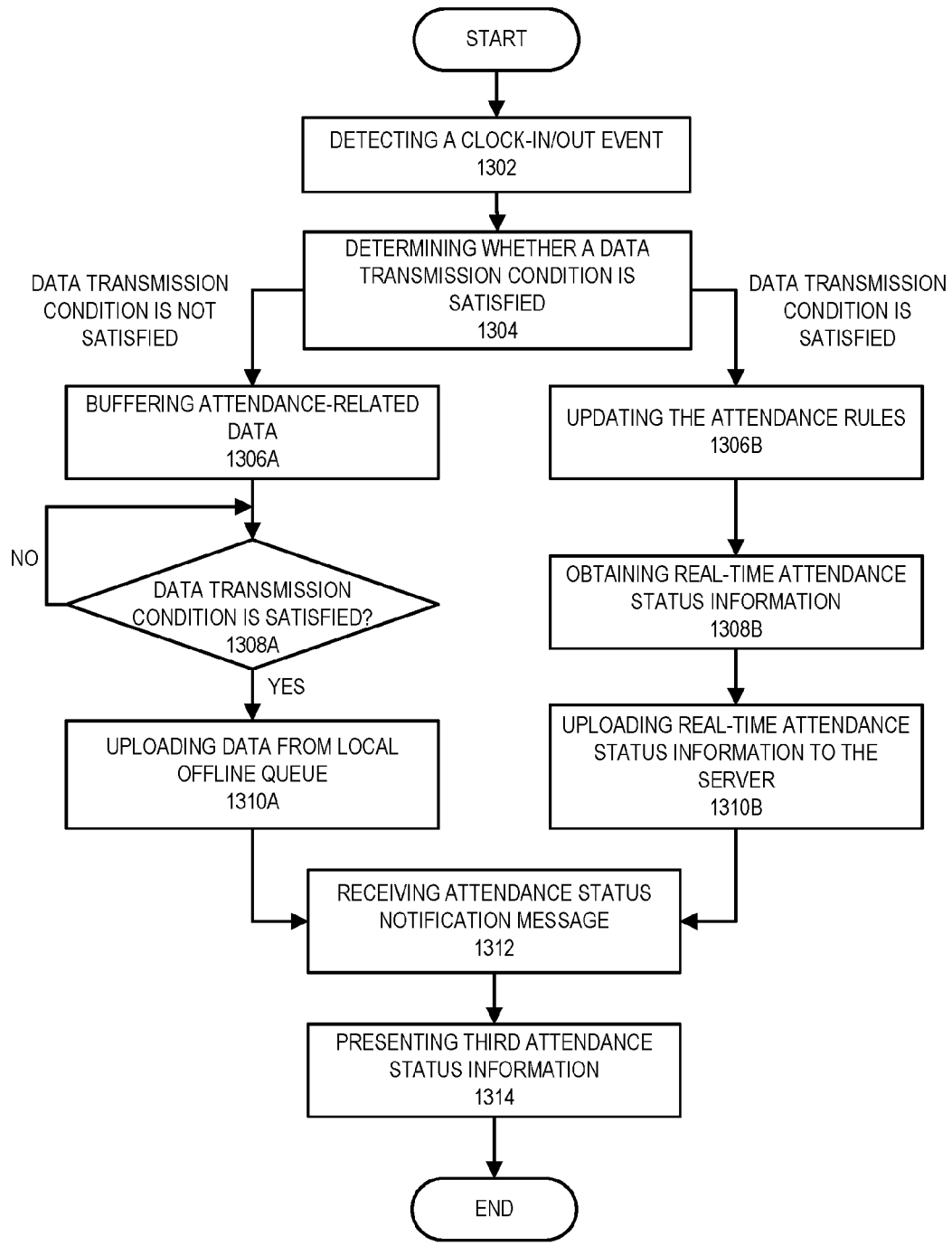
FIG. 13 presents a flowchart illustrating an exemplary offline attendance processing method for displaying third attendance status information, in accordance with an embodiment of the present invention

FIG. 13 presents a flowchart illustrating an exemplary offline attendance processing method for displaying third attendance status information, in accordance with an embodiment of the present invention. As illustrated in FIG. 13, the method may include the following operations:

The client may detect an attendance triggering event (e.g., a clock-in/out event) (operation 1302). The client may determine whether a data transmission condition is satisfied (operation 1304). In response to determining that a predefined data transmission condition is not satisfied, the client may proceed to perform operation 1306A. In response to determining that the data transmission condition is satisfied, the client may proceed to perform operation 1306B.

The client may buffer attendance-related data (operation 1306A). The client may add the attendance-related data to a local offline queue. The attendance-related data may include data describing the attendance triggering event.

In response to determining that the data transmission condition is satisfied, the client may continue with operation 1310A. In response to determining that the data transmission condition is not satisfied the client may continue to wait (operation 1308A).

The client may upload data from the local offline queue to a server end (operation 1310A).

The attendance-related data may include description information associated with the attendance triggering event. For example, such description information may include a clock-in/out time (e.g., an occurrence time of the attendance triggering event) or geographic location information. The server may obtain (e.g., generate) third attendance status information based on the description information and predefined attendance rules, and the server end may store various versions of the attendance rules. Thus, the server can select attendance rules applicable to the current attendance triggering event and obtain the third attendance status information.

In response to determining that the data transmission condition is satisfied in operation 1304, the client may update the attendance rules (operation 1306B).

The client may obtain real-time attendance status information (operation 1308B).

The client may upload the real-time attendance status information to the server (operation 1310B). The data uploading operation for the real-time attendance status information is described with respect to operations 706B-710B as illustrated in FIG. 7.

The client may receive an attendance status notification message pushed by the server (operation 1312).

The client may display a third attendance status information included in the attendance status notification message (operation 1314).

Operations 1306A to 1310A correspond to the data transmission path from clock-in/out data 416 to offline queue 418 at the client to clock-in/out data 422 at the server end, as depicted by dashed lines in the architecture diagram illustrated in FIG. 4. This indicates that the client uploads the attendance-related data to the server end in an asynchronous and offline manner and a corresponding offline clock-in/out function is implemented.

Operations 1306B-1310B correspond to the data transmission path from clock-in/out data 416 at the client to clock-in/out data 422 at the server end, as depicted by a solid line in the architecture diagram illustrated in FIG. 4. This indicates that the client uploads the attendance-related data to the server end in real time to implement an online clock-in/out function.

The server end may generate the third attendance status information. The client then only needs to perform temporary offline buffering of attendance-related data, without needing to determine whether locally stored attendance rules are applicable to data describing an attendance triggering event.

Display of Notification Message Based on Third Attendance Status Information

Figure 14:
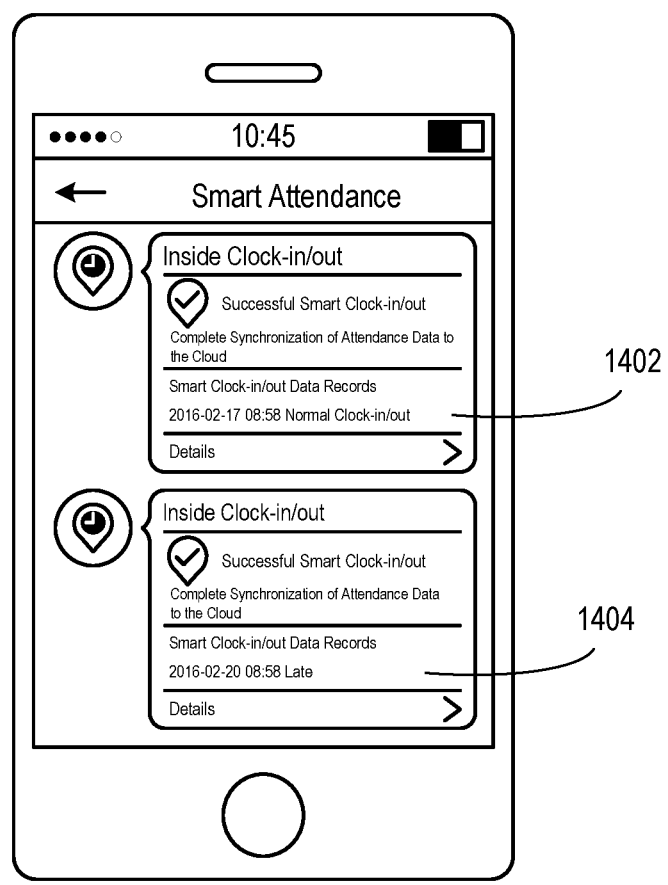
FIG. 14 presents a schematic diagram illustrating an exemplary display of a notification message based on third attendance status information, in accordance with an embodiment of the present invention.

FIG. 14 presents a schematic diagram illustrating an exemplary display of a notification message based on third attendance status information, in accordance with an embodiment of the present invention. After the server end receives the attendance-related data uploaded by the client and generates the corresponding third attendance status information, the server end may push an attendance status notification message as illustrated in FIG. 14 to the client. The user may then view the specific content of the third attendance status information and learn of the attendance status. The attendance status notification message as illustrated in FIG. 14 may contain the general content of the third attendance status information, such as the displayed text "2016-02-17 08:58 Normal Clock-in/out" 1402 and the displayed text "2016-02-20 08:58 Late"1404. After the user clicks on one of the displayed text "Details" of the attendance status notification message, the user can view the detailed content of the corresponding third attendance status information.

Exemplary Offline Attendance Processing Method Performed on Server End

Figure 15:
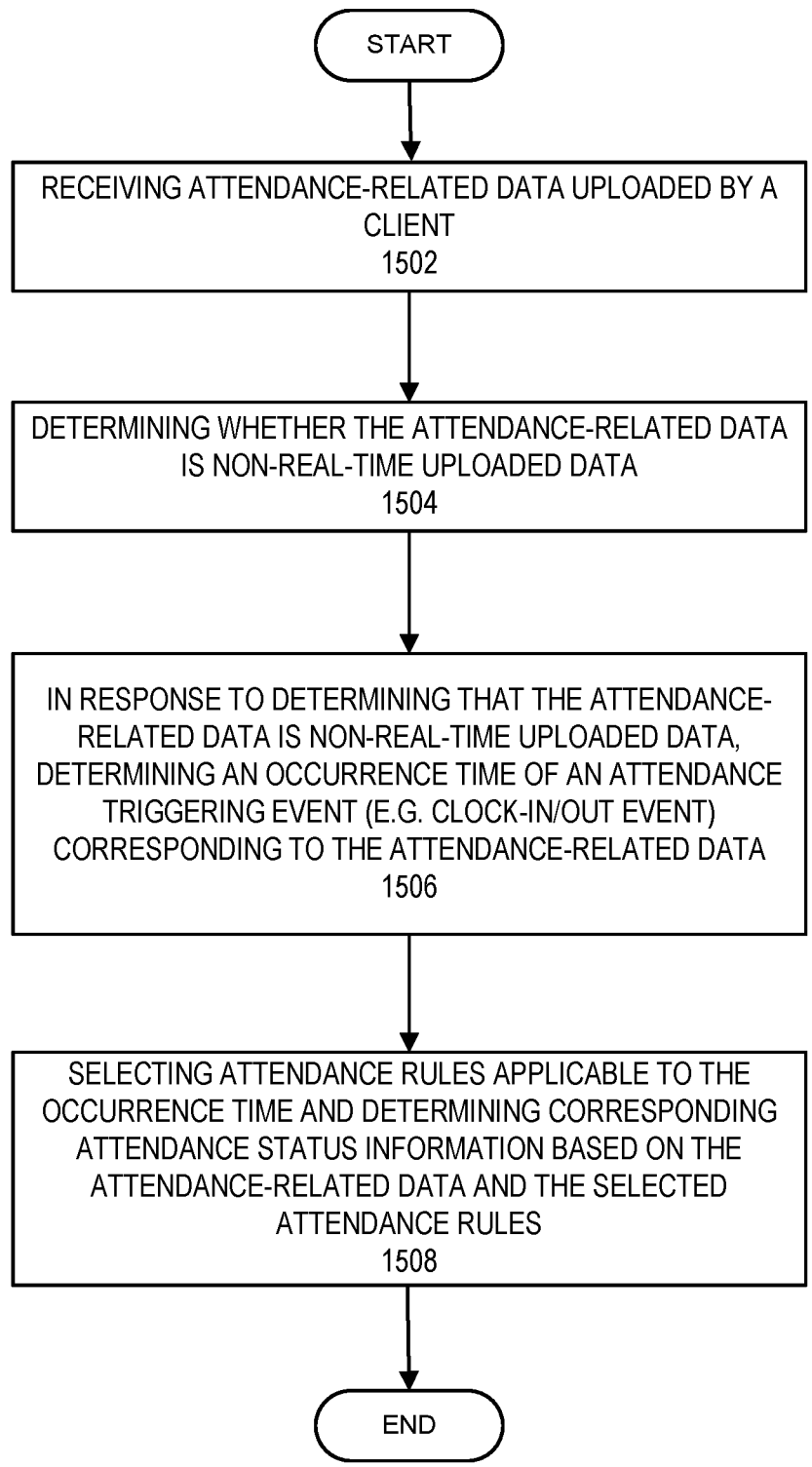
FIG. 15 presents a flowchart illustrating an offline attendance processing method performed at a server end, in accordance with an embodiment of the present invention.

Corresponding to the embodiment illustrated in FIG. 13, FIG. 15 presents a flowchart illustrating an offline attendance processing method performed at a server end, in accordance with an embodiment of the present invention.

As illustrated in FIG. 15, the method may be performed by a server and may include the following operations:

The server may receive attendance-related data uploaded by a client (operation 1502). The server may determine whether the attendance-related data is non-real-time uploaded data (operation 1504).

In response to determining that the attendance-related data is non-real-time uploaded data, the server may determine an occurrence time of an attendance triggering event (e.g. clock-in/out event) corresponding to the attendance-related data (operation 1506). The attendance triggering event may occur on a preset page of the client in an offline state.

The server may select attendance rules applicable to the occurrence time and determine corresponding attendance status information based on the attendance-related data and the selected attendance rules (operation 1508).

Since the attendance-related data is non-real-time data uploaded by the user, the attendance-related data does not necessarily match the newest attendance rules at the server end. By selecting and matching attendance rules according to the occurrence times, the server can select the attendance rules that are applicable to the attendance-related data even if the system (or user) changes the attendance rules. This avoids applying the wrong attendance rules due to using the newest attendance rules, and helps to ensure the correctness and accuracy of attendance status information.

Exemplary System Architecture

Figure 16:
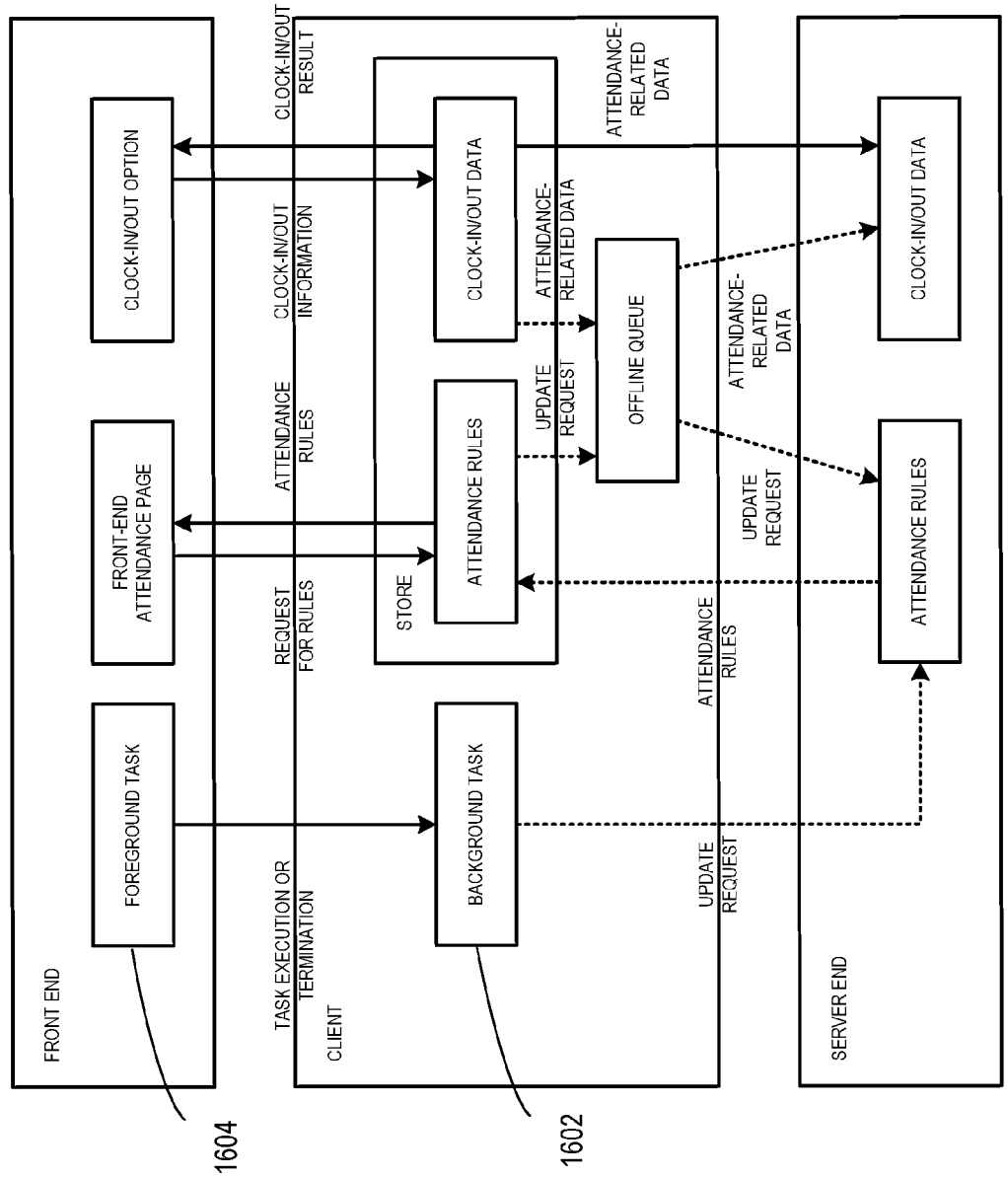
FIG. 16 presents a schematic diagram illustrating an exemplary system architecture, in accordance with an embodiment of the present invention.

FIG. 16 presents a schematic diagram illustrating an exemplary system architecture, in accordance with an embodiment of the present invention. The system architecture diagram illustrated in FIG. 4 may be improved upon to obtain the system architecture diagram illustrated in FIG. 16. As illustrated in FIG. 16, compared with the embodiment illustrated in FIG. 4, the system architecture may include an additional background task 1602 added to the client and an additional foreground task 1604 added to the front end. As an example, foreground task 1504 may be associated with an update key (not illustrated) on an attendance management page, so that the user can manually trigger an update operation on attendance rules through the update key. Similarly, the system may add an upload key to the attendance management page, so that the user can manually trigger an offline uploading operation for attendance-related data using the upload key. By setting and configuring the tasks, more operation choices can be made available to the user for different scenarios, thereby improving the user experience.

Exemplary Electronic Device

Figure 17:
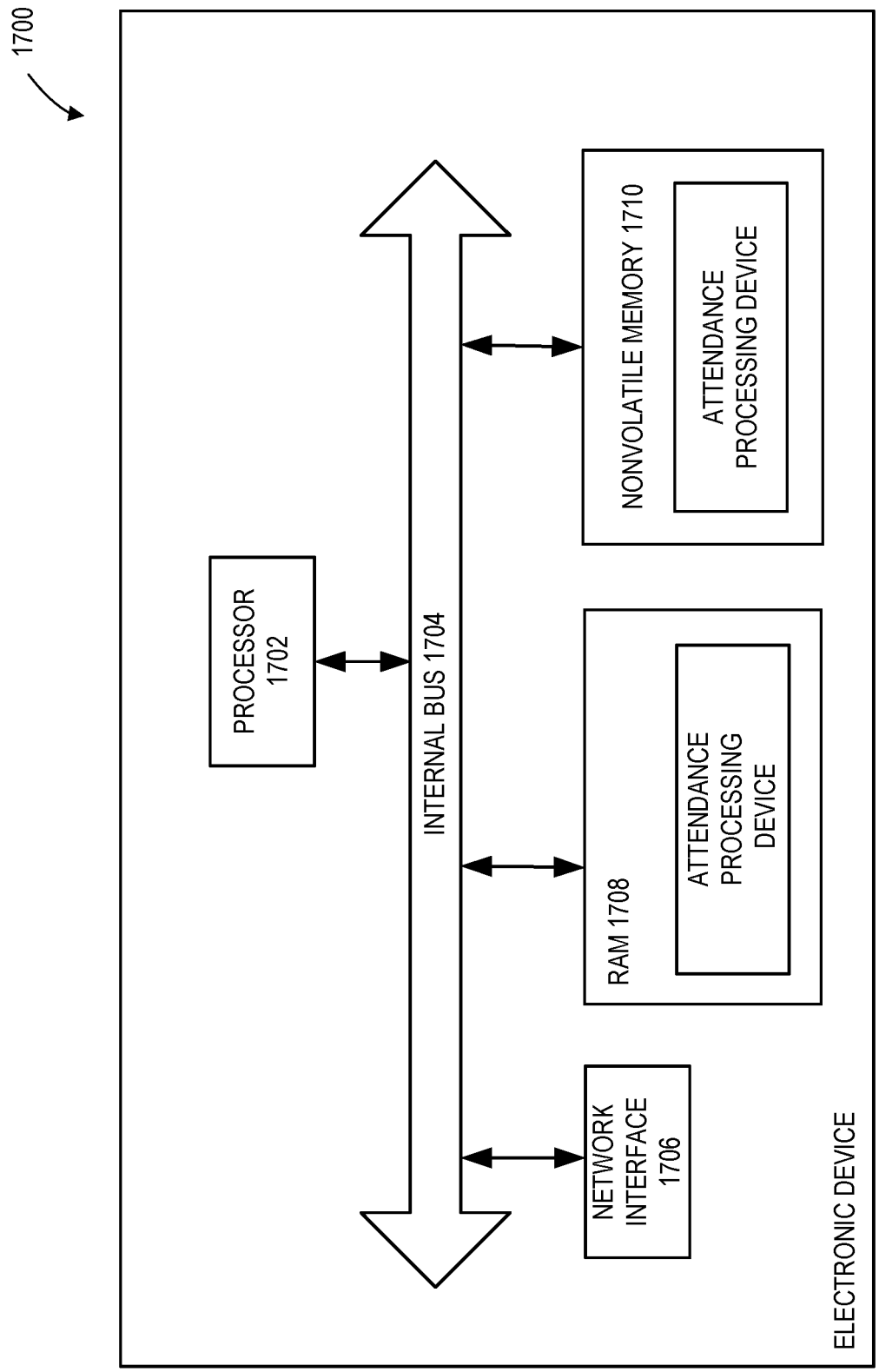
FIG. 17 presents a schematic diagram illustrating an exemplary electronic device, in accordance with an embodiment of the present invention.

FIG. 17 presents a schematic diagram illustrating an exemplary electronic device 1700, in accordance with an embodiment of the present invention. Electronic device 1700 may represent an attendance processing device. At the hardware level, electronic device 1700 may include a processor 1702, an internal bus 1704, a network interface 1706, random access memory (RAM) 1708, and nonvolatile memory 1710. The electronic device may include other components for offline attendance processing. Processor 1702 may read a corresponding computer program from nonvolatile memory 1710 and store the computer program in RAM 1708, and then execute the program.

Exemplary Offline Attendance Processing Device

Figure 18:
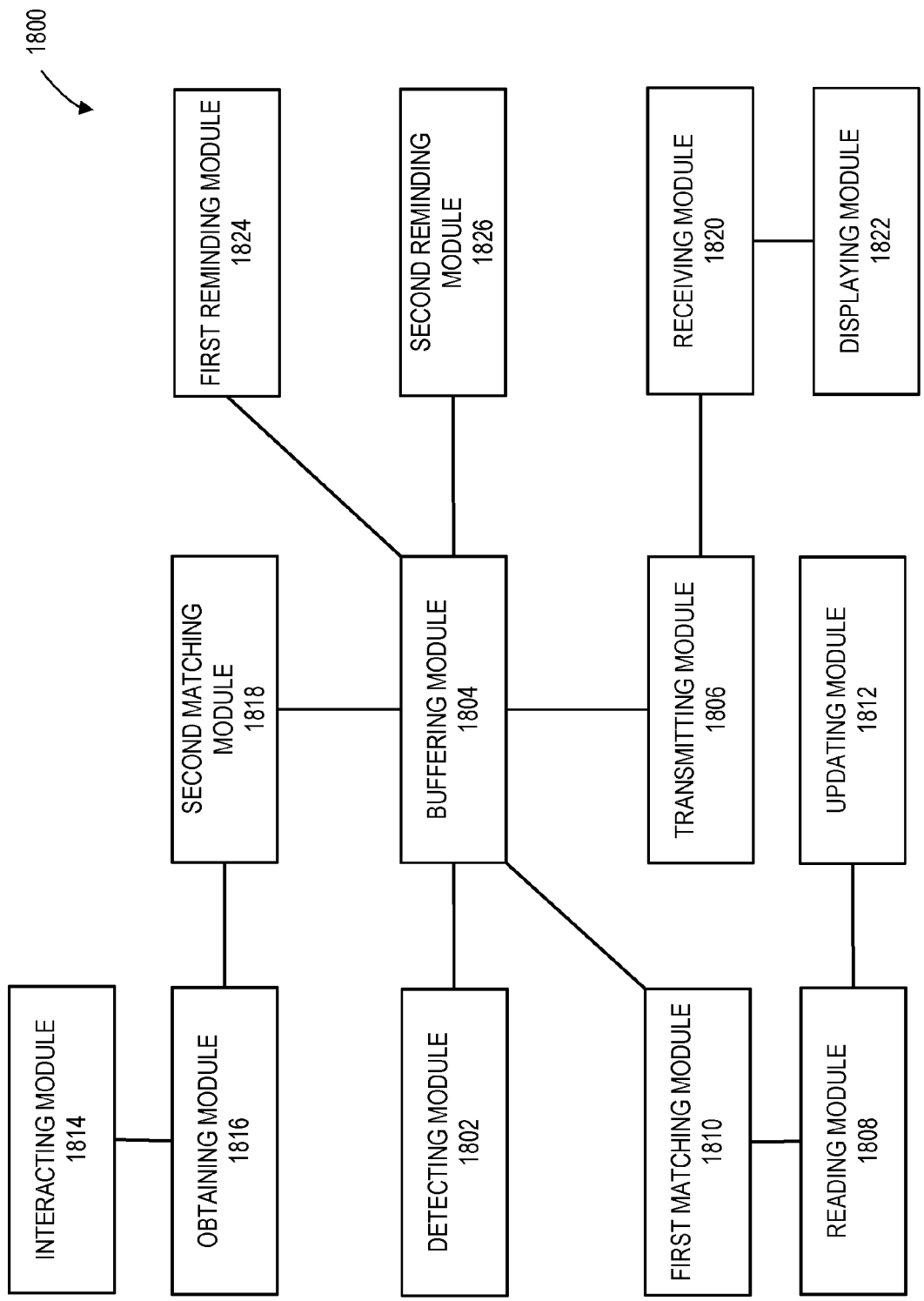
FIG. 18 presents a schematic diagram illustrating an exemplary offline attendance processing device, in accordance with an embodiment of the present invention

FIG. 18 presents a schematic diagram illustrating an exemplary offline attendance processing device 1800, in accordance with an embodiment of the present invention. Offline attendance processing device 1800 may include application software installed on a client device. The device may include multiple components, including a detecting module 1802, a buffering module 1804, a transmitting module 1806, a reading module 1808, a first reminding module 1810, an updating module 1812, an interaction module 1814, an obtaining module 1816, a second matching module 1818, a receiving module 1820, a displaying module 1822, a first reminding module 1824, and a second reminding module 1826.

Detecting module 1802 may detect an attendance triggering event occurring on a preset page displayed on a client device.

Buffering module 1804 may determine if a predetermined data transmission condition is satisfied, and, in response to determining that a predetermined data transmission condition is not satisfied, buffer attendance-related data corresponding to the attendance triggering event.

Transmitting module 1806 may, in response to determining that the predetermined data transmission condition is satisfied, transmit the attendance-related data to a server.

The data transmission condition may include at least one of requiring a connection to a predetermined network and requiring a strength level of a network signal to reach a predetermined value.

Reading module 1808 may read attendance rules stored on a client device.

First matching module 1810 may apply at least one applicable locally stored attendance rule to data describing the attendance triggering event to obtain a first attendance status information, in which the attendance-related data includes a first attendance status information.

Updating module 1812 may, in response to determining that the predetermined data transmission condition is not satisfied, generate an update request related to attendance rules stored on the client device. Updating module 1812 may also send the update request to the server after the data transmission condition is satisfied, and update the attendance rules stored on the client device.

Interaction module 1814 may, in response to determining that the predetermined data transmission condition is satisfied, exchange data with the server.

Obtaining module 1816 may determine that attendance rules stored on a client device are not applicable to an occurrence time of the attendance triggering event, and obtain attendance rules applicable to the occurrence time from a server.

Second matching module 1818 may obtain second attendance status information by matching up data describing the attendance triggering event with applicable attendance rules. The attendance-related data may include the second attendance status information.

The attendance-related data may include description information associated with the attendance triggering event, thereby allowing the server to obtain (e.g., generate) third attendance status information based on the description information and predefined attendance rules.

Receiving module 1820 may receive an attendance status notification message pushed by the server.

Displaying module 1822 may display third attendance status information included in the attendance status notification message.

First reminding module 1824 may display first reminding information corresponding to the satisfaction status in or near an attendance triggering area on the front-end attendance page. The attendance triggering area may be used to trigger an attendance triggering event.

Second reminding module 1826 may display the second reminding information corresponding to a transmission condition on or near an attendance-related data presentation area on a predetermined page.

Exemplary Offline Attendance Processing Server

Figure 19:
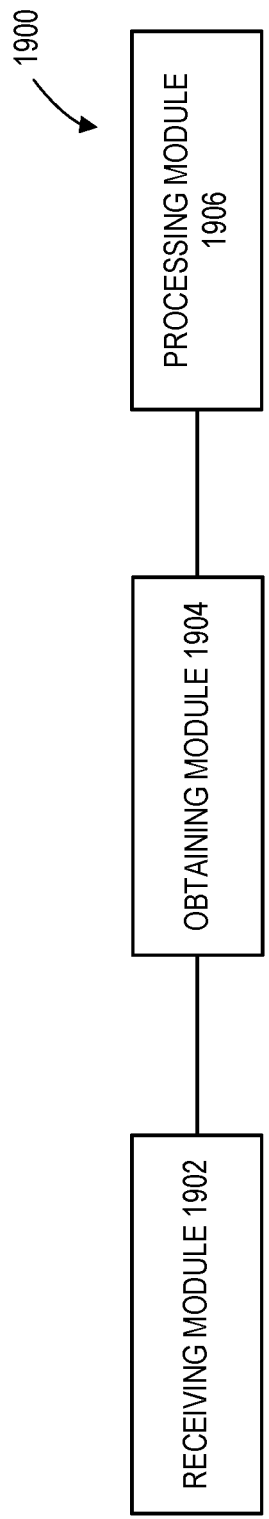
FIG. 19 presents a schematic diagram illustrating an exemplary offline attendance processing server, in accordance with an embodiment of the present invention.

FIG. 19 presents a schematic diagram illustrating an exemplary offline attendance processing server 1900, in accordance with an embodiment of the present invention. Offline attendance processing server 1900 may include multiple components, including a receiving module 1902, an obtaining module 1904, and a processing module 1906.

Receiving module 1902 may receive attendance-related data uploaded by a client.

Obtaining module 1904 may determine whether the attendance-related data is non-real-time uploaded data. In response to determining that the attendance-related data is non-real-time uploaded data, obtaining module 1904 may determine an occurrence time of an attendance triggering event (e.g. clock-in/out event) corresponding to the attendance-related data. The attendance triggering event may occur on a preset page displayed on the client in an offline state.

Processing module 1906 may select attendance rules applicable to the occurrence time and determine corresponding attendance status information based on the attendance-related data and the selected attendance rules.

Exemplary Offline Attendance Processing Device

Figure 20:
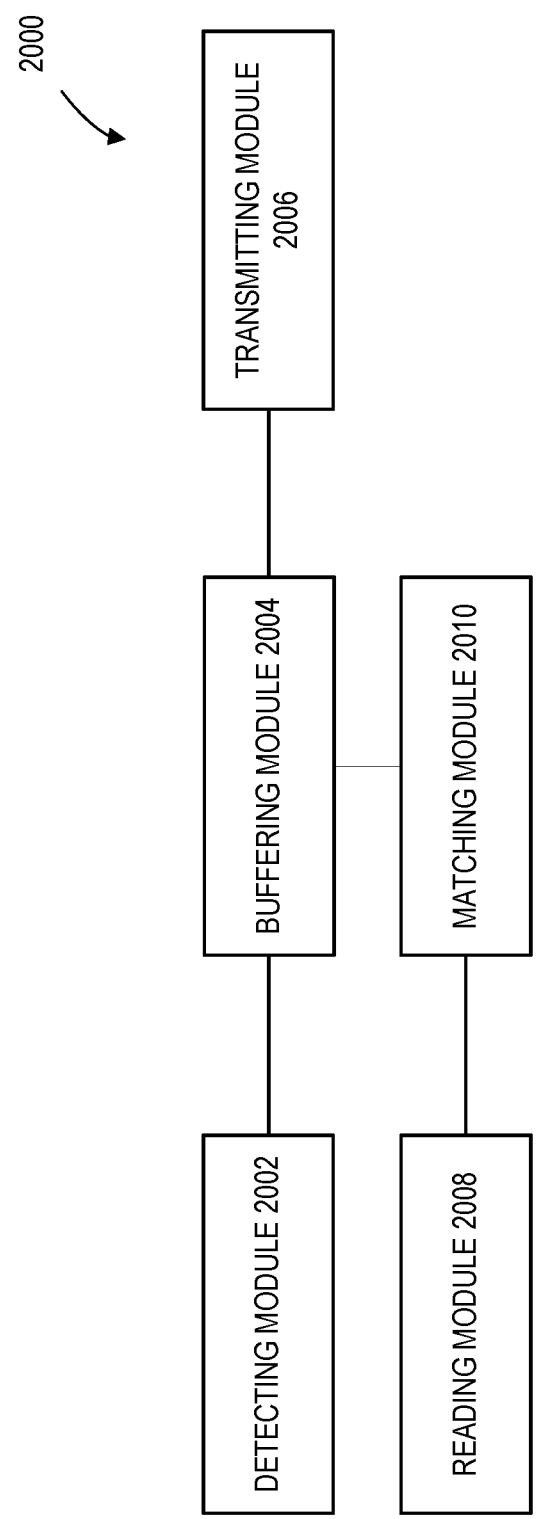
FIG. 20 presents a schematic diagram illustrating an exemplary offline attendance processing device, in accordance with an embodiment of the present invention.

FIG. 20 presents a schematic diagram illustrating an exemplary offline attendance processing device 2000, in accordance with an embodiment of the present invention. Offline attendance processing device 2000 may include multiple components, including a detecting module 2002, a buffering module 2004, a transmitting module 2006, a reading module 2008, and a matching module 2010.

Detecting module module 2002 may detect an attendance triggering event occurring on a preset attendance page of an instant messaging application.

Buffering module 2004 may determine whether a network connection is established. In response to determining that a network connection is not established, buffering module 2004 may buffer attendance-related data corresponding to the attendance triggering event.

Transmitting module 2006 may, in response to determining that the network connection is restored, transmit the attendance-related data to a server.

Reading module 2008 may read attendance rules stored with an instant messaging application.

Matching module 2010 may obtain attendance status information by matching up the attendance rules with data describing the attendance triggering event. The attendance-related data may include the attendance status information.

Exemplary Embodiments

Embodiments of the present invention include a system for offline attendance processing. During operation, the system may detect an attendance triggering event occurring on a preset page displayed on a client device. The system may determine whether a predetermined data transmission condition is satisfied. In response to determining that the predetermined data transmission condition is not satisfied, the system may buffer, at the client device, attendance-related data corresponding to the attendance triggering event. In response to determining that the predetermined data transmission condition is satisfied, the system may transmit the attendance-related data to a server.

In a variation on this embodiment, the predetermined data transmission condition includes at least one of requiring a connection to a predetermined network and requiring a strength level of a network signal to reach a predetermined value.

In a variation on this embodiment, the system may read attendance rules stored on the client device, and apply at least one attendance rule to data describing the attendance triggering event to obtain a first attendance status information. The attendance-related data may include the first attendance status information.

In a further variation, in response to determining that the predetermined data transmission condition is not satisfied, the system may generate an update request related to attendance rules stored on the client device. The system may send the update request to the server after the predetermined data transmission condition is satisfied, and update the attendance rules stored on the client device.

In a variation on this embodiment, in response to determining that the predetermined data transmission condition is satisfied, the system may exchange data with the server. The system may determine that attendance rules stored on the client device are not applicable to an occurrence time of the attendance triggering event. The system may obtain one or more attendance rules applicable to the occurrence time from the server. The system may then obtain second attendance status information by matching up data describing the attendance triggering event with the applicable attendance rules, in which the attendance-related data includes the second attendance status information.

In a variation on this embodiment, the attendance-related data includes description information associated with the attendance triggering event, thereby allowing the server to obtain third attendance status information based on the description information and predefined attendance rules.

In a further variation, the system may receive an attendance status notification message pushed by the server, and display third attendance status information included in the attendance status notification message.

In a variation on this embodiment, the system may display first reminding information corresponding to a satisfaction status in or near an attendance triggering area on a front-end attendance page, in which the attendance triggering area is used to trigger an attendance triggering event.

In a variation on this embodiment, the system may display the second reminding information corresponding to a transmission condition on or near an attendance-related data presentation area on a predetermined page.

In a variation on this embodiment, the system may detect a second attendance triggering event occurring on a preset attendance page of an instant messaging application. The system may determine whether a network connection is established. In response to determining that the network connection is not established, the system may buffer second attendance-related data corresponding to the second attendance triggering event. In response to determining that the network connection is restored, the system may transmit the second attendance-related data to the server.

In a variation on this embodiment, the system may read attendance rules stored with an instant messaging application. The system may obtain attendance status information by matching up the attendance rules with data describing the second attendance triggering event, in which the second attendance-related data includes the attendance status information.

In a further embodiment, during operation, the system may receive attendance-related data uploaded by a client. The system may determine whether the attendance-related data is non-real-time uploaded data. In response to determining that the attendance-related data is non-real-time uploaded data, the system may determine an occurrence time of an attendance triggering event corresponding to the attendance-related data. The system may select attendance rules applicable to the occurrence time, and determine corresponding attendance status information based on the attendance-related data and the selected attendance rules.

In another embodiment, the system may detect an attendance triggering event occurring on a preset attendance page of an instant messaging application. The system may determine whether a network connection is established. In response to determining that the network connection is not established, the system may buffer attendance-related data corresponding to the attendance triggering event. In response to determining that the network connection is restored, the system may transmit the attendance-related data to the server.

One embodiment of the present invention provides a device for offline attendance processing at a client. The device may include a detecting module that detects an attendance triggering event occurring on a preset page displayed on a client device. The device may also include a buffering module that determines if a predetermined data transmission condition is satisfied, and, in response to determining that a predetermined data transmission condition is not satisfied, buffer attendance-related data corresponding to the attendance triggering event at the client device. The device may also include a transmitting module that, in response to determining that the predetermined data transmission condition is satisfied, transmits the attendance-related data to a server.

In a further embodiment, the device may include a receiving module that receives attendance-related data uploaded by a client. The device may also include an obtaining module that determines whether the attendance-related data is non-real-time uploaded data. In response to determining that the attendance-related data is non-real-time uploaded data, the obtaining module may determine an occurrence time of an attendance triggering event (e.g. clock-in/out event) corresponding to the attendance-related data. The attendance triggering event may occur on a preset page displayed on the client in an offline state. The device may also include a processing module that selects attendance rules applicable to the occurrence time and determines corresponding attendance status information based on the attendance-related data and the selected attendance rules.

In another embodiment, the device may include a detecting module that detects an attendance triggering event occurring on a preset attendance page of an instant messaging application. The device may also include a buffering module that determines whether a network connection is established. In response to determining that a network connection is not established, the buffering module may buffer attendance-related data corresponding to the attendance triggering event. The device may also include a transmitting module that, in response to determining that the network connection is restored, transmits the attendance-related data to a server.

Exemplary Server

Figure 21:
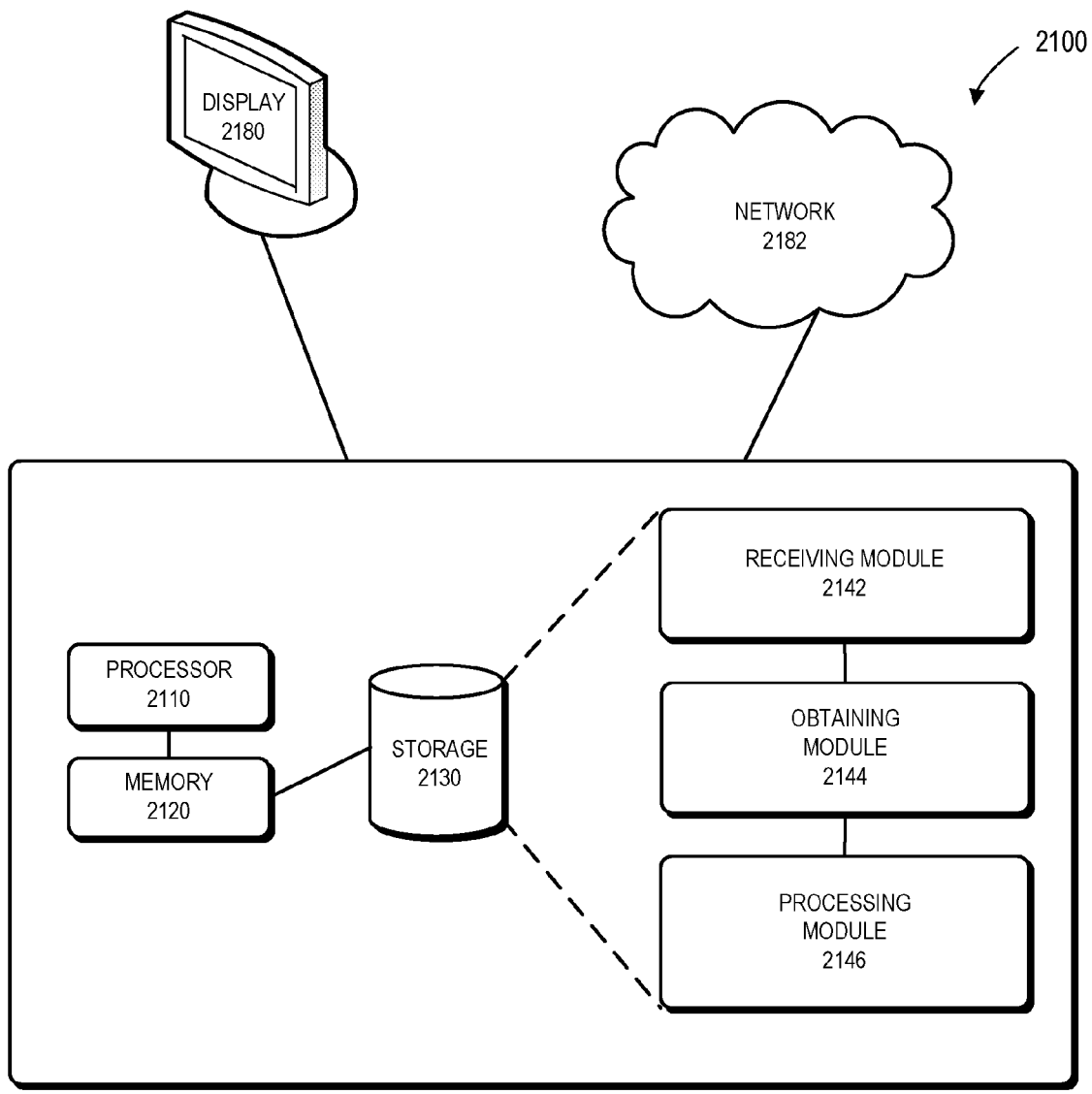
FIG. 21 presents a schematic diagram illustrating an exemplary server for offline attendance processing, in accordance with an embodiment of the present invention.

FIG. 21 presents a schematic diagram illustrating an exemplary server 2100 for offline attendance processing, in accordance with an embodiment of the present application. Server 2100 may include a processor 2110, a memory 2120, and a storage device 2130. Storage 2130 typically stores instructions that can be loaded into memory 2120 and executed by processor 2110 to perform the methods described above. In one embodiment, the instructions in storage 2130 can implement a receiving module 2142, an obtaining module 2144, and a processing module 2146 which can communicate with each other through various means.

In some embodiments, modules 2142-2146 can be partially or entirely implemented in hardware and can be part of processor 2110. Further, in some embodiments, the server may not include a separate processor and memory. Instead, in addition to performing their specific tasks, modules 2142-2146, either separately or in concert, may be part of special-purpose computation engines.

Storage 2130 stores programs to be executed by processor 2110. Specifically, storage 2130 stores a program that implements a server (e.g., application) for task processing. During operation, the application program can be loaded from storage 2130 into memory 2120 and executed by processor 2110. As a result, server 2100 can perform the functions described herein. Server 2100 can further include an optional display 2180, and can be coupled via one or more network interfaces to a network 2182.

Receiving module 2142 may receive attendance-related data uploaded by a client.

Obtaining module 2144 may determine whether the attendance-related data is non-real-time uploaded data. In response to determining that the attendance-related data is non-real-time uploaded data, obtaining module 1904 may determine an occurrence time of an attendance triggering event (e.g. clock-in/out event) corresponding to the attendance-related data. The attendance triggering event may occur on a preset page displayed on the client in an offline state.

Processing module 2146 may select attendance rules applicable to the occurrence time and determine corresponding attendance status information based on the attendance-related data and the selected attendance rules.

Embodiments of the present invention may be implemented on various universal or dedicated computer system environments or configurations. For example, the computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module may include a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium may include, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for offline attendance processing, comprising:
   detecting an attendance triggering event occurring on a preset page displayed on a client device;
   determining whether a predetermined data transmission condition is satisfied;
   in response to determining that the predetermined data transmission condition is not satisfied, buffering, at the client device, attendance-related data corresponding to the attendance triggering event;
   in response to determining that the predetermined data transmission condition is satisfied, transmitting the attendance-related data to a server;
   determining that attendance rules stored on the client device are not applicable to an occurrence time of the attendance triggering event;
   obtaining one or more attendance rules applicable to the occurrence time from the server; and
   obtaining first attendance status information by matching up data describing the attendance triggering event with the applicable attendance rules.

2. The method of claim 1, wherein the predetermined data transmission condition includes at least one of requiring a connection to a predetermined network and requiring a strength level of a network signal to reach a predetermined value.

3. The method of claim 1, further comprising:
   reading the attendance rules stored on the client device; and
   applying at least one attendance rule to data describing the attendance triggering event to obtain second attendance status information, wherein the attendance-related data includes the second attendance status information.

4. The method of claim 3, further comprising:
   in response to determining that the predetermined data transmission condition is not satisfied, generating an update request related to the attendance rules stored on the client device;
   sending the update request to the server after the predetermined data transmission condition is satisfied; and
   updating the attendance rules stored on the client device.

5. The method of claim 1, further comprising:
   in response to determining that the predetermined data transmission condition is satisfied, exchanging data with the server,
   wherein the attendance-related data includes the first attendance status information.

6. The method of claim 1, wherein the attendance-related data includes description information associated with the attendance triggering event, thereby allowing the server to obtain second attendance status information based on the description information and predefined attendance rules.

7. The method of claim 6, further comprising:
   receiving an attendance status notification message pushed by the server; and
   displaying the second attendance status information included in the attendance status notification message.

8. The method of claim 1, further comprising:
   displaying reminding information corresponding to a satisfaction status in or near an attendance triggering area on a front-end attendance page, wherein the attendance triggering area is used to trigger an attendance triggering event.

9. The method of claim 1, further comprising:
displaying reminding information corresponding to a transmission condition on or near an attendance-related data presentation area on a predetermined page.

10. The method of claim 1, further comprising:
detecting a second attendance triggering event occurring on a preset attendance page of an instant messaging application;
determining whether a network connection is established;
in response to determining that the network connection is not established, buffering second attendance-related data corresponding to the second attendance triggering event; and
in response to determining that the network connection is restored, transmitting the second attendance-related data to the server.

11. The method of claim 10, further comprising:
reading attendance rules stored with the instant messaging application; and
obtaining attendance status information by matching up the attendance rules with data describing the second attendance triggering event, wherein the attendance-related data includes the second attendance status information.

12. A computing system comprising:
one or more processors; and
a non-transitory computer-readable medium coupled to the one or more processors storing instructions stored that, when executed by the one or more processors, cause the computing system to perform a method for offline attendance processing, the method comprising:
detecting an attendance triggering event occurring on a preset page displayed on a client device in an offline state;
determining whether a predetermined data transmission condition is satisfied;
in response to determining that the predetermined data transmission condition is not satisfied, buffering attendance-related data corresponding to the attendance triggering event;
in response to determining that the predetermined data transmission condition is satisfied, transmitting the attendance-related data to a server;
determining that attendance rules stored on the client device are not applicable to an occurrence time of the attendance triggering event;
obtaining one or more attendance rules applicable to the occurrence time from the server; and
obtaining first attendance status information by matching up data describing the attendance triggering event with the applicable attendance rules.

13. The system of claim 12, wherein the predetermined data transmission condition includes at least one of requiring a connection to a predetermined network and requiring a network signal to reach a predetermined threshold strength.

14. The system of claim 12, wherein the method further comprises:
reading the attendance rules stored on the client device; and
applying at least one attendance rule to data describing the attendance triggering event to obtain second attendance status information, wherein the attendance-related data includes the second attendance status information.

15. The system of claim 14, wherein the method further comprises:
in response to determining that the predetermined data transmission condition is not satisfied, generating an update request related to the attendance rules stored on the client device;
sending the update request to the server after the predetermined data transmission condition is satisfied; and
updating the attendance rules stored on the client device.

16. A non-transitory computer-readable storage medium storing instructions that when executed by a computer cause the computer to perform a method for offline attendance processing, the method comprising:
detecting an attendance triggering event occurring on a preset page displayed on a client device in an offline state;
determining whether a predetermined data transmission condition is satisfied;
in response to determining that the predetermined data transmission condition is not satisfied, buffering attendance-related data corresponding to the attendance triggering event;
in response to determining that the predetermined data transmission condition is satisfied, transmitting the attendance-related data to a server;
determining that attendance rules stored on the client device are not applicable to an occurrence time of the attendance triggering event;
obtaining one or more attendance rules applicable to the occurrence time from the server; and
obtaining first attendance status information by matching up data describing the attendance triggering event with the applicable attendance rules.

17. The non-transitory computer-readable storage medium of claim 16, wherein the method further comprises:
in response to determining that the predetermined data transmission condition is not satisfied, exchanging data with the server,
wherein the attendance-related data includes the first attendance status information.

18. The non-transitory computer-readable storage medium of claim 16, wherein the attendance-related data includes description information associated with the attendance triggering event, thereby allowing the server to obtain second attendance status information based on the description information and predefined attendance rules.

19. The non-transitory computer-readable storage medium of claim 18, wherein the method further comprises:
receiving an attendance status notification message pushed by the server; and
displaying the second attendance status information included in the attendance status notification message.

20. A computer-implemented method for offline attendance processing, comprising:
receiving attendance-related data uploaded by a client;
determining whether the attendance-related data is non-real-time uploaded data;
in response to determining that the attendance-related data is non-real-time uploaded data, determining an occurrence time of an attendance triggering event corresponding to the attendance-related data;
selecting attendance rules applicable to the occurrence time; and
determining corresponding attendance status information based on the attendance-related data and the selected attendance rules.

* * * * *